US012493454B2

(12) United States Patent
Kinsner et al.

(10) Patent No.: US 12,493,454 B2
(45) Date of Patent: Dec. 9, 2025

(54) INCREMENTAL JUST-IN-TIME (JIT) PERFORMANCE REFINEMENT FOR PROGRAMMABLE LOGIC DEVICE OFFLOAD

(71) Applicant: Altera Corporation, San Jose, CA (US)

(72) Inventors: Michael Kinsner, Halifax (CA); John Freeman, Waterloo (CA); Ben J. Ashbaugh, Folsom, CA (US); Rajesh Poornachandran, Portland, OR (US)

(73) Assignee: Altera Corporation, San Jose, CA (US)

(*) Notice: Subject to any disclaimer, the term of this patent is extended or adjusted under 35 U.S.C. 154(b) by 699 days.

(21) Appl. No.: 17/692,413

(22) Filed: Mar. 11, 2022

(65) Prior Publication Data

US 2022/0197610 A1 Jun. 23, 2022

(51) Int. Cl.
*G06F 8/41* (2018.01)
*G06F 9/54* (2006.01)

(52) U.S. Cl.
CPC ................ *G06F 8/41* (2013.01); *G06F 9/541* (2013.01)

(58) Field of Classification Search
CPC .................................. G06F 8/41; G06F 9/541
USPC .................................................. 717/125–151
See application file for complete search history.

(56) References Cited

U.S. PATENT DOCUMENTS 6,842,894 B1 * 1/2005 Havemose .............. G06F 9/465 717/148
7,721,275 B2 * 5/2010 Kestner ............... G06F 9/45516 717/157
7,941,792 B2 * 5/2011 Tromey .............. G06F 9/44589 717/148
8,108,844 B2 * 1/2012 Crutchfield ............. G06F 8/443 717/136
8,959,495 B2 * 2/2015 Chafi .................. G06F 9/45516 717/148

(Continued)

OTHER PUBLICATIONS

Ma et al., "Just In Time Assembly of Accelerators", ACM, pp. 1-6 (Year: 2015).*

(Continued)

*Primary Examiner* — Anil Khatri
(74) *Attorney, Agent, or Firm* — Nicholson De Vos Webster & Elliott LLP

(57) ABSTRACT

An apparatus to facilitate incremental just-in-time (JIT) performance refinement for programmable logic device offload is disclosed. The apparatus includes a processor to: initiate multiple just-in-time (JIT) compilation iterations of an application; program a first architecture of a first compilation of the multiple JIT compilation iterations to a programmable logic device and execute the application on the first architecture, wherein the first compilation comprises a faster compilation time amongst the multiple JIT compilation iterations; identify a hotspot; determine that a second compilation of the multiple JIT compilation iterations is complete, wherein the second compilation comprises a slower compilation time than the first compilation; and program a second architecture of the second compilation of the multiple JIT compilation iterations to the programmable logic device and execute the application on the second architecture.

19 Claims, 13 Drawing Sheets

(56) References Cited

U.S. PATENT DOCUMENTS

| | | | | |
|---|---|---|---|---|
| 8,972,975 | B1 * | 3/2015 | Rogers | G06F 8/61<br>717/176 |
| 9,459,850 | B2 * | 10/2016 | Bates | G06F 8/48 |
| 9,900,264 | B1 * | 2/2018 | Chen | G06Q 30/0283 |
| 10,143,916 | B1 * | 12/2018 | Hawk | A63F 13/00 |
| 10,516,396 | B2 * | 12/2019 | Coole | G06F 13/4022 |
| 11,556,494 | B1 * | 1/2023 | Grohoski | G06F 15/7871 |
| 2022/0067721 | A1 * | 3/2022 | Yan | G06F 8/4441 |

OTHER PUBLICATIONS

Schkufza et al., "Just-in-Time Compilation for Verilog", ACM, pp. 1-16 (Year: 2019).*
Li et al., "Validating JIT Compilers via Compilation Space Exploration", ACM, pp. 1-37 (Year: 2025).*
Suganuma et al, "Design and Evaluation of Dynamic Optimizations for a Java Just-In-Time Compiler", ACM, pp. 1-54 (Year: 2005).*
Niu et al, "RockJIT: Securing Just-In-Time Compilation Using Modular Control-Flow Integrity", ACM, pp. 1-12 (Year: 2014).*

* cited by examiner

1100

Start just-in-time compilation of fast compile architecture, intermediate compile architecture, and full custom datapath compile architecture for kernel program of an application
1110

Program the fast compile architecture to FPGA region and execute kernel program on the fast compile architecture in the FPGA region
1120

Kernel a hotspot to be accelerated? 1130 — No → Continue executing on fast compile machine 1140

Yes ↓

Program the intermediate compile architecture to the FPGA region and execute the kernel program on the intermediate compile architecture in the FPGA region
1150

Kernel a hotspot needing further acceleration? 1160 — No → Continue executing on current architecture 1170

Yes ↓

Program the full custom datapath compile architecture to the FPGA region and execute the kernel program on the full custom datapath compile architecture in the FPGA region
1180

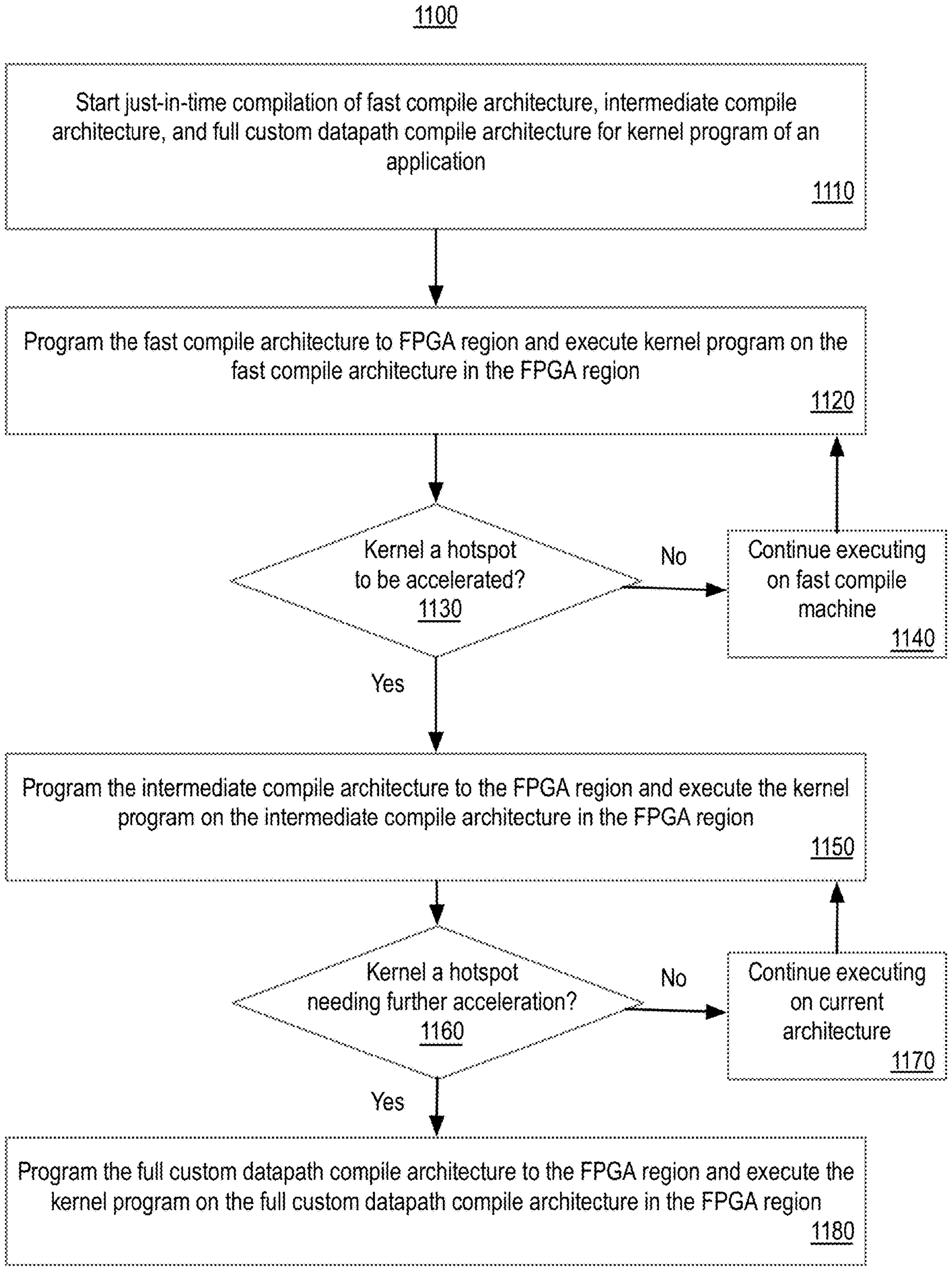

Determine that a new compilation iteration of a kernel program of an application is ready for programming to a region of a programmable logic device, where the region of the programmable logic device is currently executing a different compilation iteration of the kernel program

1210

Orchestrate, based on a task graph of the application, a re-programming operation to reconfigure the region

1220

Save the state and memory of the kernel program

1230

Reprogram the region with the new compilation iteration of the kernel program to the region

1240

Transfer the state and the memory of the kernel program to the region with the new compilation iteration

1250

Execute the kernel program on region with the new compilation iteration

1260

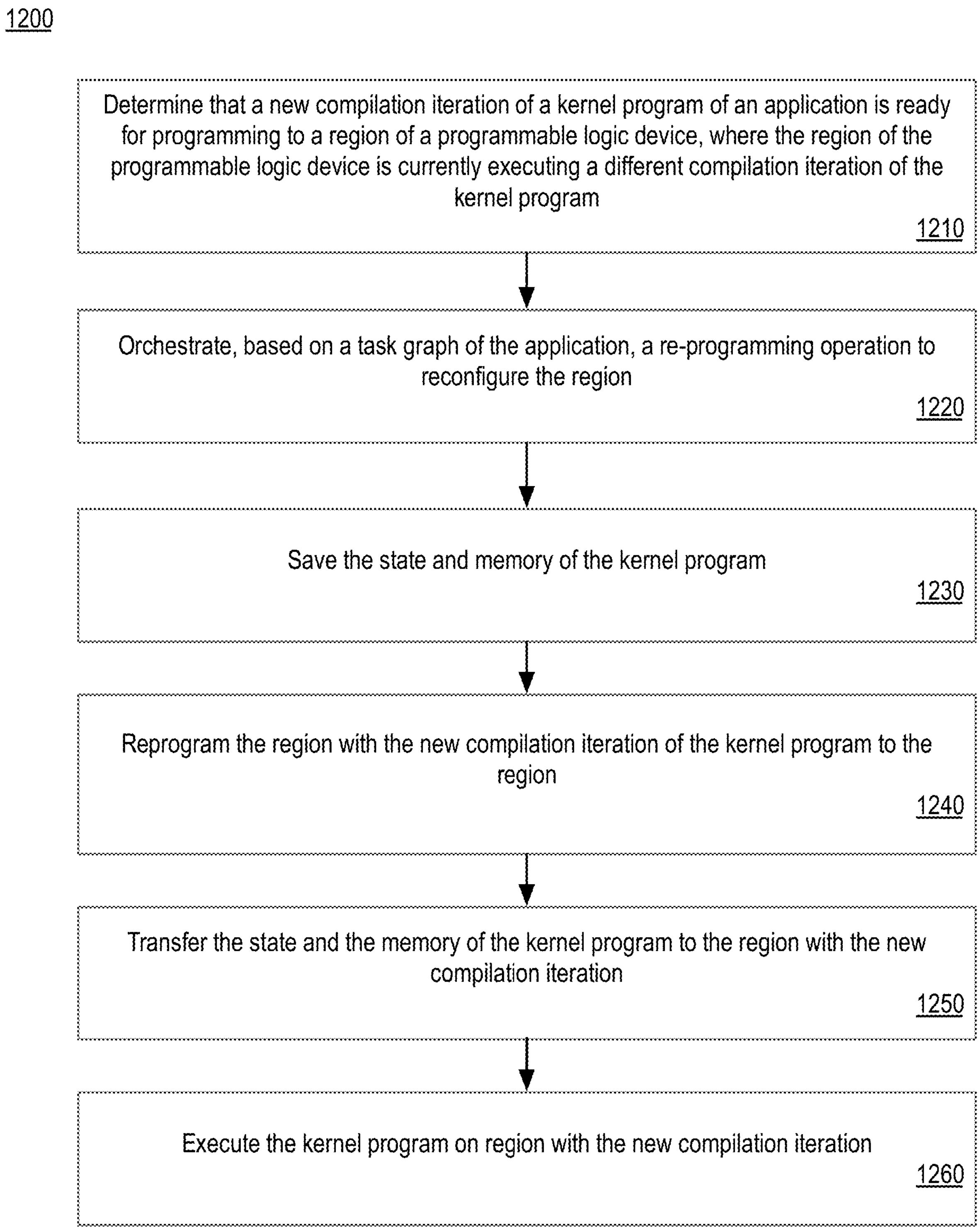

*FIG. 12*

INCREMENTAL JUST-IN-TIME (JIT) PERFORMANCE REFINEMENT FOR PROGRAMMABLE LOGIC DEVICE OFFLOAD

FIELD

This disclosure relates generally to data processing and more particularly to incremental just-in-time (JIT) performance refinement for programmable logic device offload.

BACKGROUND OF THE DISCLOSURE

The use of hardware accelerators (e.g., graphics processing units (GPU), programmable logic devices, etc.) has enabled faster workload processing and has emerged as an effective architecture for acceleration of Artificial Intelligence (AI) and Machine Learning (ML) use cases. Meanwhile, the growing popularity of AI and ML is increasing the demand for virtual machines (VMs).

A programmable logic device (e.g., field programmable gate array (FPGA)) is one type of hardware accelerator that can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party such as a cloud service provider.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

FIG. 11 is a flow diagram illustrating a method for incremental just-in-time (JIT) performance refinement for programmable logic device offload, in accordance with implementations of the disclosure.

FIG. 12 is a flow diagram illustrating a method for transparent reconfiguration as part of incremental JIT performance refinement for programmable logic device offload, in accordance with implementations of the disclosure.

DETAILED DESCRIPTION

Figure 1:
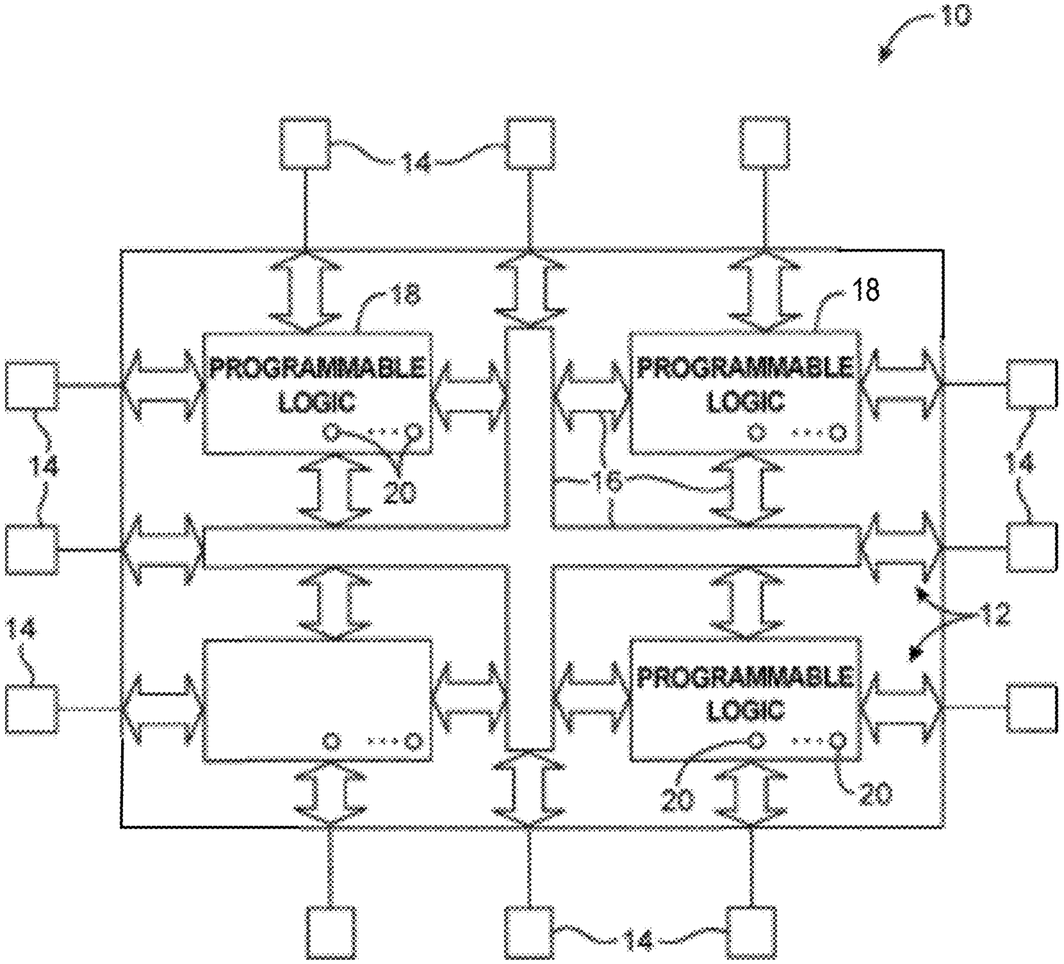
FIG. 1 is a diagram of an illustrative programmable integrated circuit in accordance with an embodiment.

Implementations of the disclosure are directed to an incremental just-in-time (JIT) performance refinement for programmable logic device offload. The use of hardware accelerators (e.g., specialized central processing units (CPUs), graphics processing units (GPU), programmable logic devices, etc.) has enabled faster workload processing and has emerged as an effective architecture for acceleration of Artificial Intelligence (AI) and Machine Learning (ML) use cases. Obtaining high computer performance on hardware accelerators relies on use of code that is optimized, power-efficient, and scalable. The demand for high performance computing continues to increase due to demands in AI, ML, video analytics, data analytics, as well as in traditional high-performance computing (HPC).

Workload diversity in current applications has resulting in a corresponding demand for architectural diversity. No single architecture is best for every workload. A mix of scalar, vector, matrix, and spatial (SVMS) architectures deployed in CPU, GPU, AI, and field programable gate array (FPGA) accelerators can be used to provide the performance for the diverse workloads.

Furthermore, coding for CPUs and accelerators relies on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as data parallel C++ (DPC++) programming language. The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that best accelerates the workload. A host is available to simplify development and debugging of device code.

With respect to the accelerators discussed here, implementations may focus on programmable logic devices (e.g., field programmable gate array (FPGA)) as one type of hardware accelerator that can be configured to support a data parallel programming model. In some implementations, the programmable logic device can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party such as a cloud service provider.

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

Various embodiments are directed to techniques for incremental just-in-time (JIT) performance refinement for programmable logic device offload, for instance.

System Overview

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Programmable integrated circuits use programmable memory elements to store configuration data. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element is configured to provide a static output signal. The static output signals that are supplied by the memory elements serve as control signals. These control signals are applied to programmable logic on the integrated circuit to customize the programmable logic to perform a desired logic function.

It may sometimes be desirable to reconfigure only a portion of the memory elements during normal operation. This type of reconfiguration in which only a subset of memory elements are being loaded with new configuration data during runtime is sometimes referred to as "partial reconfiguration". During partial reconfiguration, new data should be written into a selected portion of memory elements (sometimes referred to as "memory cells").

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Examples of programmable logic device 10 include, but is not limited to, programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. System configurations in which device 10 is a programmable logic device such as an FPGA is sometimes described as an example but is not intended to limit the scope of the present embodiments.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metaloxide-semiconductor (NMOS) pass transistors in programmable components such as multiplexers. When a memory element output is high, an NMOS pass transistor controlled by that memory element can be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
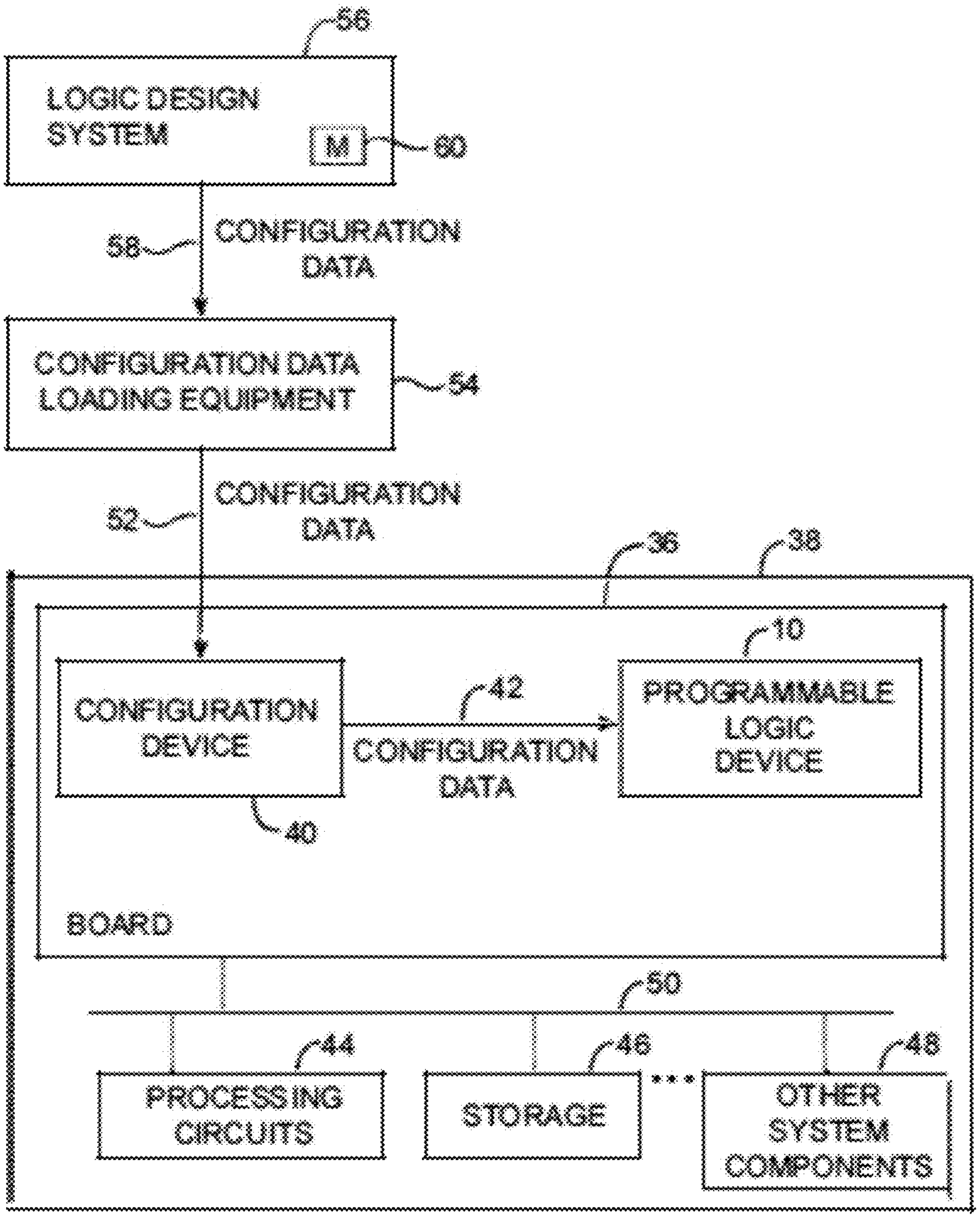
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

Figure 3:
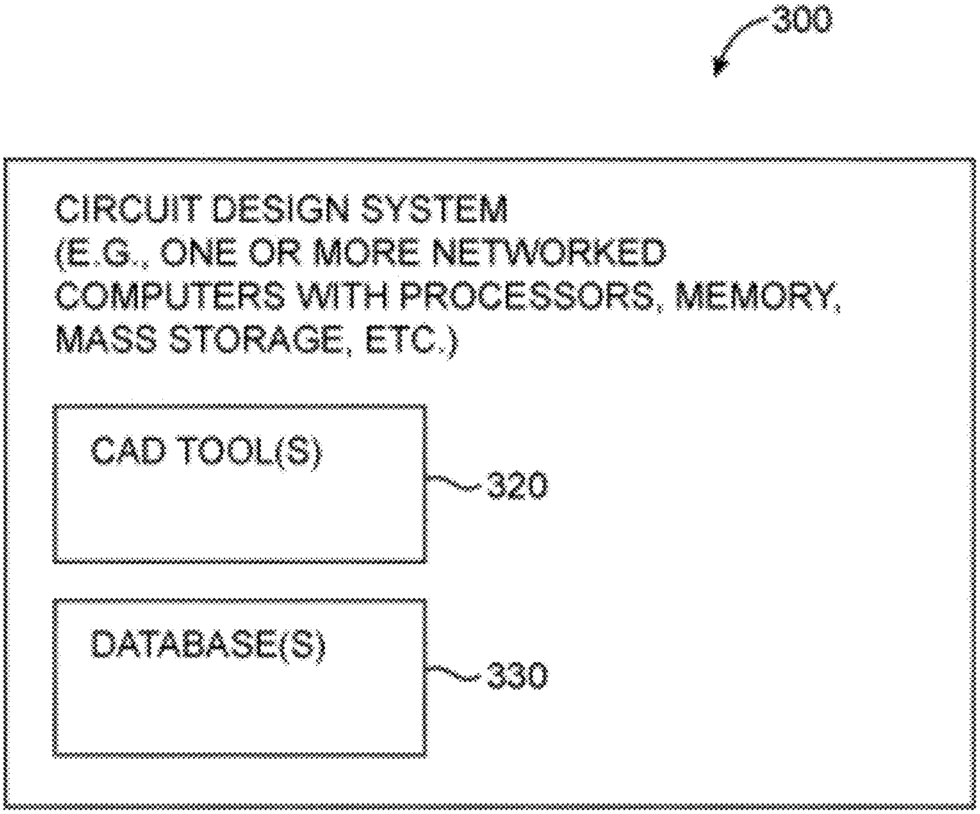
FIG. 3 is a diagram of a circuit design system that may be used to design integrated circuits in accordance with an embodiment.

An illustrative logic circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods (processes). When performing these processes, the computing equipment is configured to implement the functions of circuit design system 300.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
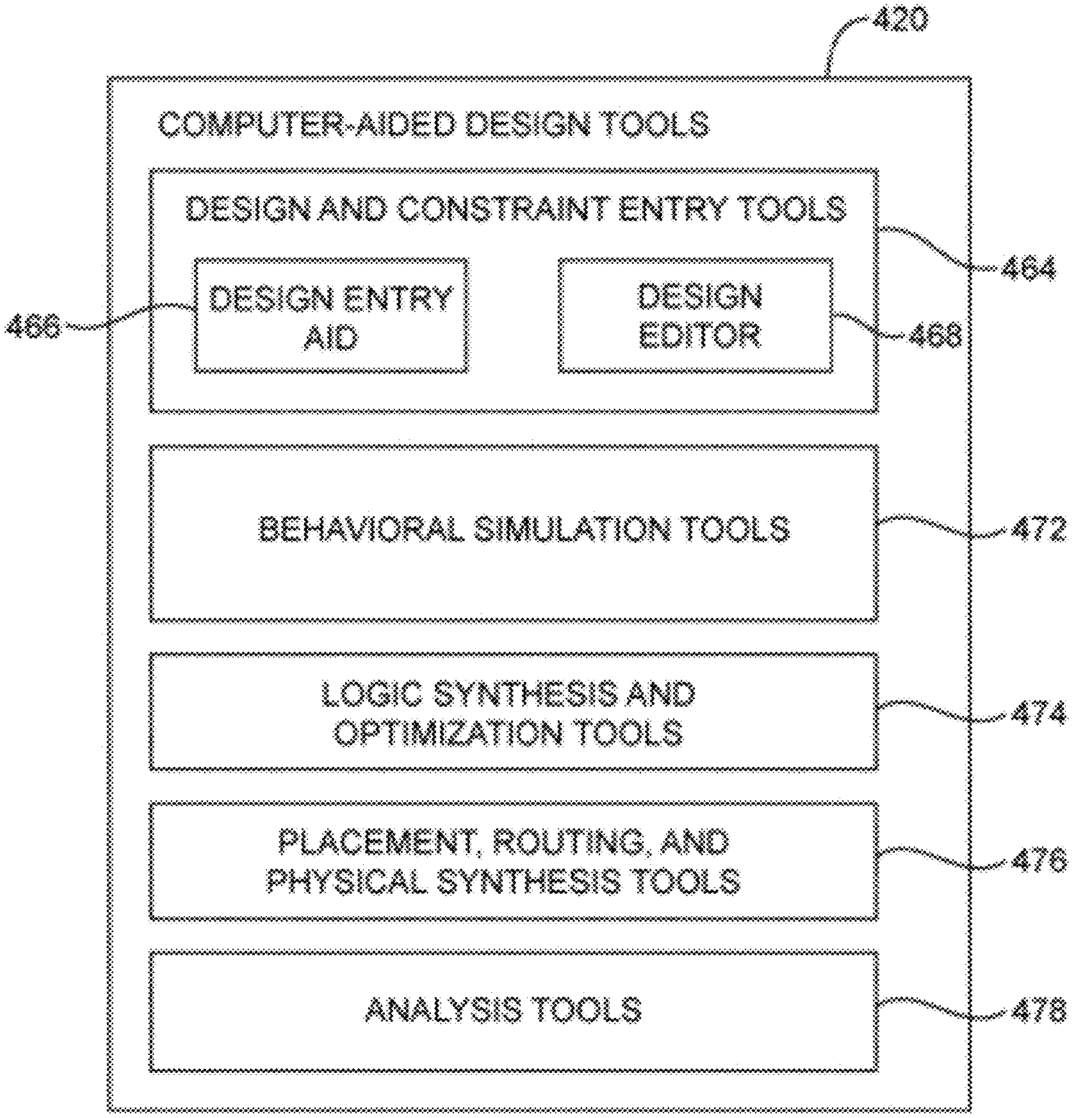
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL, SYCL, or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as an FPGA).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
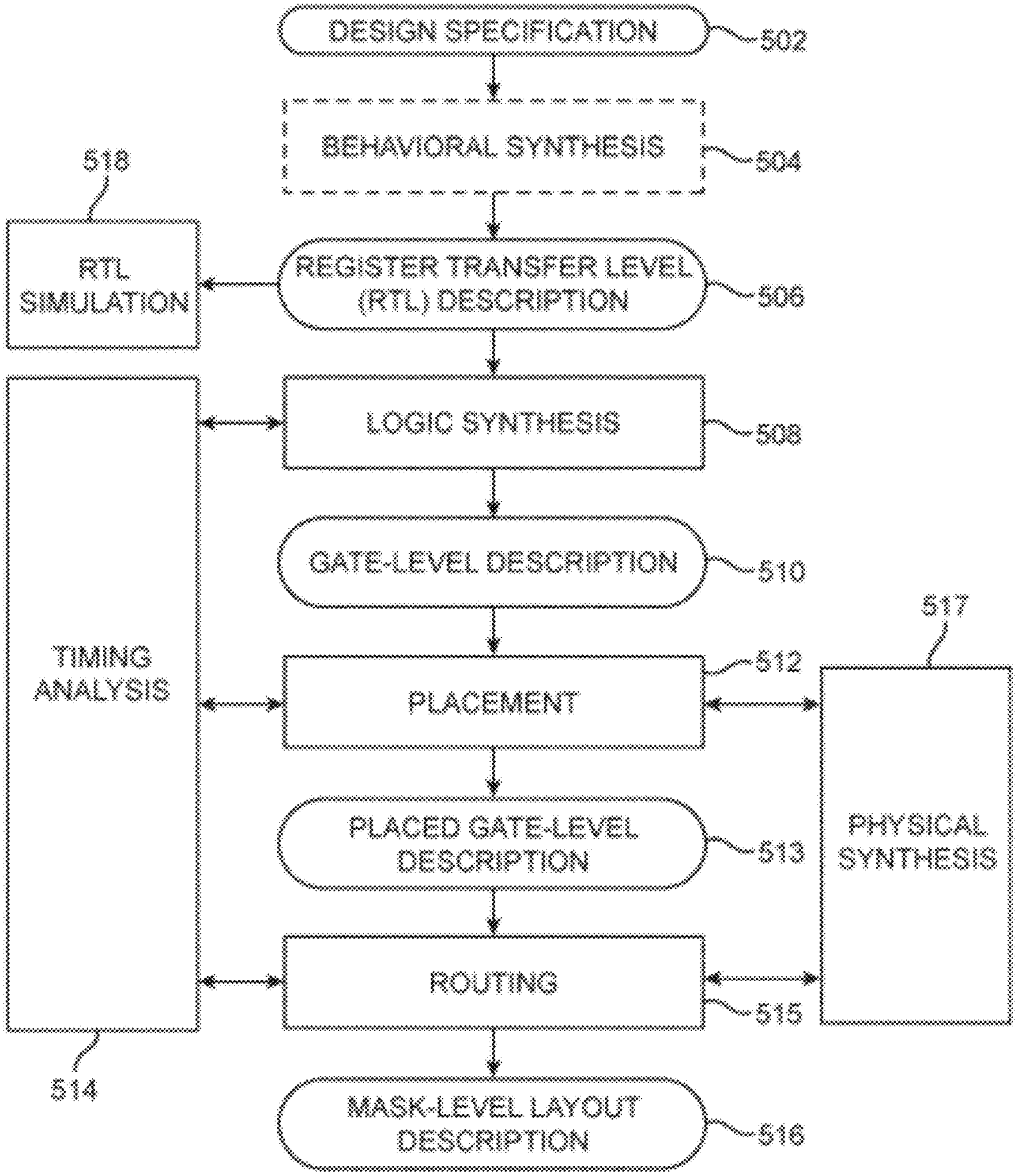
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (System Verilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-by-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a determined location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a mask-level layout description 516 (sometimes referred to as routed gate-level description 516). The mask-level layout description 516 generated by the design flow of FIG. 5 may sometimes be referred to as a device configuration bit stream or a device configuration image.

While placement and routing is being performed at steps 512 and 515, physical synthesis operations 517 may be concurrently performed to further modify and optimize the circuit design (e.g., using physical synthesis tools 476 of FIG. 4).

Multi-Tenant Usage

In implementations of the disclosure, programmable integrated circuit device 10 may be configured using tools described in FIGS. 2-5 to support a multi-tenant usage model or scenario. As noted above, examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. System configurations in which device 10 is a programmable logic device such as an FPGA is sometimes described as an example but is not intended to limit the scope of the present embodiments.

Figure 6:
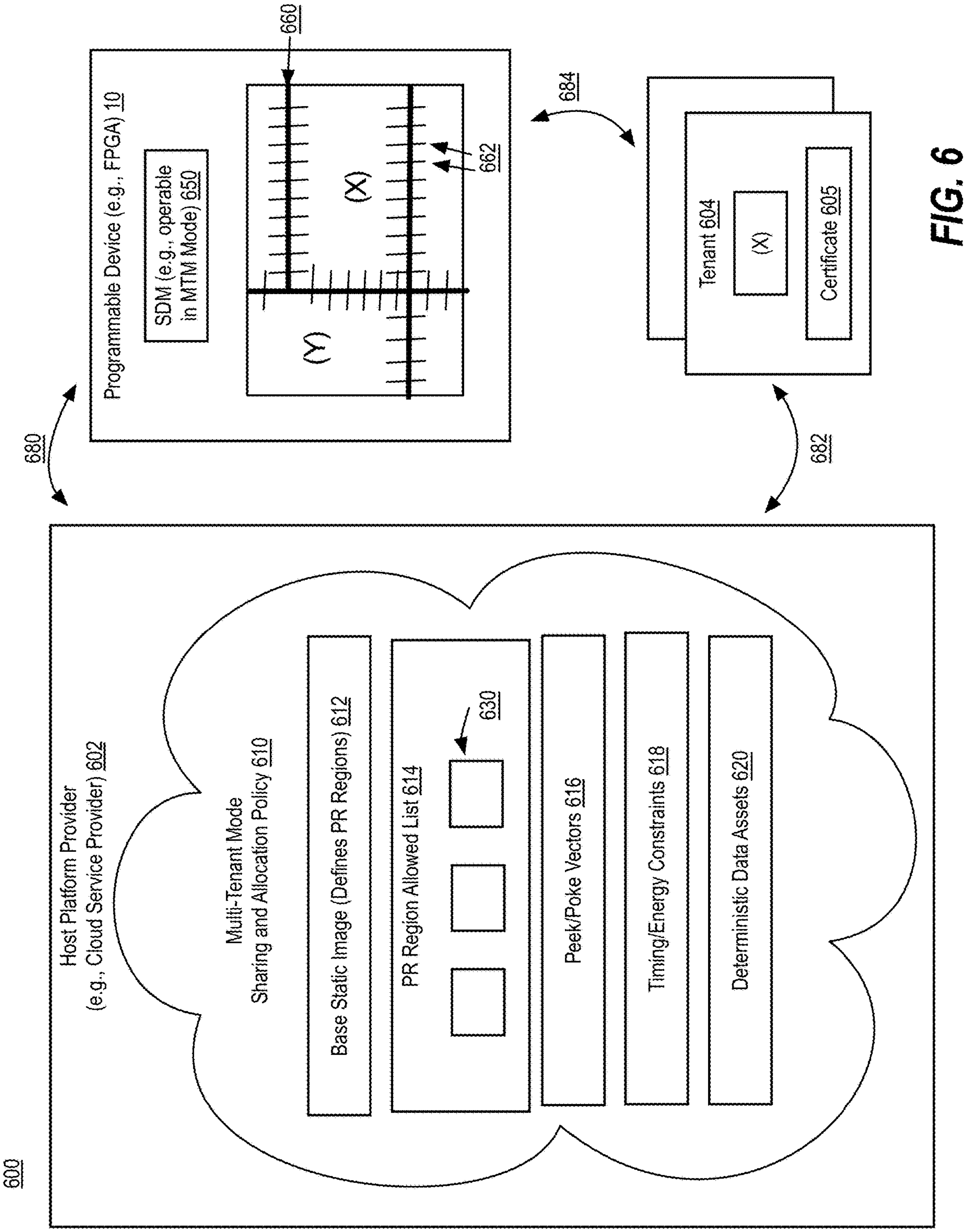
FIG. 6 is a diagram of an illustrative multitenancy system in accordance with an embodiment.

In accordance with an embodiment, FIG. 6 is a diagram of a multitenancy system such as system 600. As shown in FIG. 6, system 600 may include at least a host platform provider 602 (e.g., a server, a cloud service provider or "CSP"), a programmable integrated circuit device 10 such as an FPGA, and multiple tenants 604 (sometimes referred to as "clients"). The CSP 602 may interact with FPGA 10 via communications path 680 and may, in parallel, interact with tenants 604 via communications path 682. The FPGA 10 may separately interact with tenants 604 via communications path 684. In a multitenant usage model, FPGA 10 may be provisioned by the CSP 602 to support each of various tenants/clients 604 running their own separate applications. It may be assumed that the tenants do not trust each other, that the clients do not trust the CSP, and that the CSP does not trust the tenants.

The FPGA 10 may include a secure device manager (SDM) 650 that acts as a configuration manager and security enclave for the FPGA 10. The SDM 650 can conduct reconfiguration and security functions for the FPGA 10. For example, the SDM 650, can conduct functions including, but not limited to, sectorization, PUF key protection, key management, hard encrypt/authenticate engines, and zeroization. Additionally, environmental sensors (not shown) of the FPGA 10 that monitor voltage and temperature can be controlled by the SDM. Furthermore, device maintenance functions, such as secure return material authorization (RMA) without revealing encryption keys, secure debug of designs and ARM code, and secure key managed are additional functions enabled by the SDM 650.

Cloud service provider 602 may provide cloud services accelerated on one or more accelerator devices such as application-specific integrated circuits (ASICs), graphics processor units (GPUs), and FPGAs to multiple cloud customers (i.e., tenants). In the context of FPGA-as-a-service usage model, cloud service provider 602 may offload more than one workload to an FPGA 10 so that multiple tenant workloads may run simultaneously on the FPGA as different partial reconfiguration (PR) workloads. In such scenarios, FPGA 10 can provide security assurances and PR workload isolation when security-sensitive workloads (or payloads) are executed on the FPGA.

Cloud service provider 602 may define a multitenancy mode (MTM) sharing and allocation policy 610. The MTM sharing and allocation policy 610 may set forth a base configuration bitstream such as base static image 612, a partial reconfiguration region allowed list such as PR allowed list 614, peek and poke vectors 616, timing and energy constraints 618 (e.g., timing and power requirements for each potential tenant or the overall multitenant system), deterministic data assets 620 (e.g., a hash list of binary assets or other reproducible component that can be used to verify the proper loading of tenant workloads into each PR region), etc. Policy 610 is sometimes referred to as an FPGA multitenancy mode contract. One or more components of MTM sharing and allocation policy 610 such as the base static image 612, PR region allowed list 61, and peek/poke vectors 616 may be generated by the cloud service provider using design tools 420 of FIG. 4.

Figure 7:
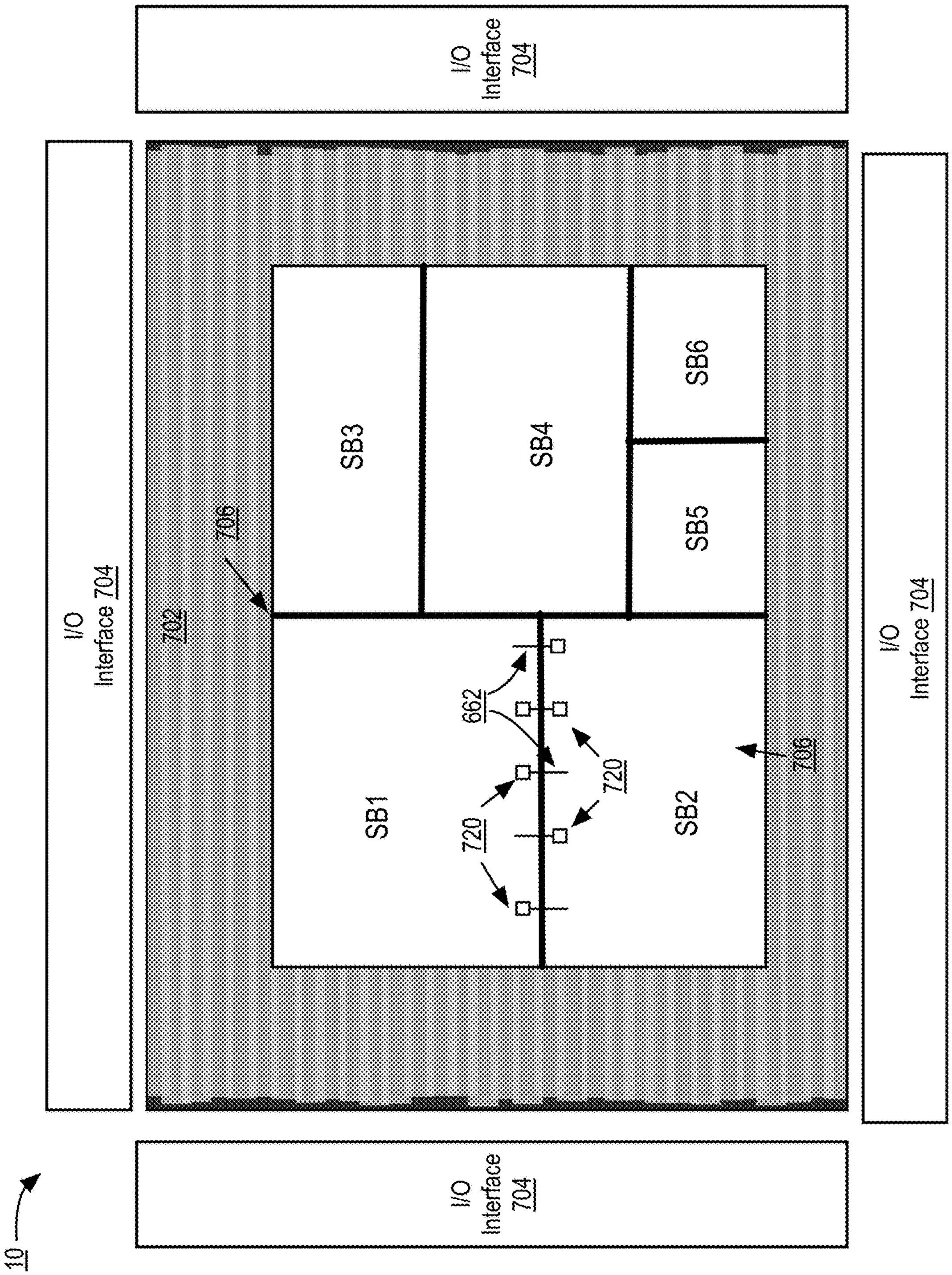
FIG. 7 is a diagram of a programmable integrated circuit having a static region and multiple partial reconfiguration (PR) sandbox regions in accordance with an embodiment.

The base static image 612 may define a base design for device 10 (see, e.g., FIG. 7). As shown in FIG. 7, the base static image 612 may define the input-output interfaces 704, one or more static region(s) 702, and multiple partial reconfiguration (PR) regions each of which may be assigned to a respective tenant to support an isolated workload. Static region 702 may be a region where all parties agree that the configuration bits cannot be changed by partial reconfiguration. For example, static region may be owned by the server/host/CSP. Any resource on device 10 should be assigned either to static region 702 or one of the PR regions (but not both).

The PR region allowed list 614 may define a list of available PR regions 630 (see FIG. 6). Each PR region for housing a particular tenant may be referred to as a PR "sandbox," in the sense of providing a trusted execution environment (TEE) for providing spatial/physical isolation and preventing potential undesired interference among the multiple tenants. Each PR sandbox may provide assurance that the contained PR tenant workload (sometimes referred to as the PR client persona) is limited to configured its designated subset of the FPGA fabric and is protected from access by other PR workloads. The precise allocation of the PR sandbox regions and the boundaries 660 of each PR sandbox may also be defined by the base static image. Additional reserved padding area such as area 706 in FIG. 7 may be used to avoid electrical interference and coupling effects such as crosstalk. Additional circuitry may also be formed in padding area 706 for actively detecting and/or compensating unwanted effects generated as a result of electrical interference, noise, or power surge.

Any wires such as wires 662 crossing a PR sandbox boundary may be assigned to either an associated PR sandbox or to the static region 702. If a boundary-crossing wire 662 is assigned to a PR sandbox region, routing multiplexers outside that sandbox region controlling the wire should be marked as not to be used. If a boundary-cross wire 662 is assigned to the static region, the routing multiplexers inside that sandbox region controlling the wire should be marked as not belonging to that sandbox region (e.g., these routing multiplexers should be removed from a corresponding PR region mask).

Any hard (non-reconfigurable) embedded intellectual property (IP) blocks such as memory blocks (e.g., random-access memory blocks) or digital signal processing (DSP) blocks that are formed on FPGA 10 may also be assigned either to a PR sandbox or to the static region. In other words, any given hard IP functional block should be completely owned by a single entity (e.g., any fabric configuration for a respective embedded functional block is either allocated to a corresponding PR sandbox or the static region).

Incremental Jit Performance Refinement for Programmable Logic Device Offload

As previously described, the use of hardware accelerators has enabled faster workload processing and has emerged as an effective architecture for acceleration of diverse workloads. Workload diversity in applications relies on architectural diversity in the underlying computing platform. A mix of scalar, vector, matrix, and spatial (SVMS) architectures deployed in CPU, GPU, AI, and field programable gate array (FPGA) accelerators can be used to provide the performance for the diverse workloads.

In an architecturally diverse platform, coding for CPUs and accelerators relies on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as the DPC++ programming language. The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that best accelerates the workload. A host is available to simplify development and debugging of device code.

Programmable logic devices, such as FPGAs, are fine grained spatial devices, and as a result compile times to generate binaries that can configure the hardware are slow, often on the order of a few to a few dozen hours per design iteration. Long compilation times prevent interactive development and optimization of applications for FPGA targets because a developer cannot achieve rapid feedback and has to effectively restart their code tuning freshly after each compile finishes (often on the following workday).

FPGAs can implement many different classes of architecture on the programmable fabric, that have differing performance and compile-time characteristics. In typical development flows, a fully custom dataflow architecture is implemented from the developer's high-level design entry code (such as OpenCL, SYCL, or DPC++), because such an implementation produces the best performance and power efficiency.

In some conventional systems, the long compilation times are addressed by emulating FPGA executions on a development machine (e.g., Linux or Windows PC). Emulation of FPGA executions on a development machine can improve time between development iterations, but is slow compared to hardware execution speeds. Moreover, emulation on a development machine cannot achieve sufficient fidelity in many cases where line-rate data is to be captured and processed in an embedded hardware system.

To address the above-noted technical drawbacks, implementations of the disclosure provide for incremental just-in-time performance refinement for programmable logic device offload, such as in the programmable logic devices described above with respect to FIGS. 1-7. FPGAs can be accessed through "offline compilation", in which case the many hour compilation is triggered by the developer and allowed to complete before the application is executed on FPGA hardware. A more interactive development flow becomes possible through just-in-time (JIT) or "online" compilation, where an FPGA program can be compiled during actual execution of an application and not ahead-of-time. Implementations herein refine the JIT compilation approach by compiling multiple iterations of an application (or portions (e.g., kernels) of an application) for incremental programming to the FPGA hardware. A fastest compiled iteration (with reduced performance capabilities) can be programmed to the FPGA hardware initially to allow for a quick execution of the application. When the iterations that take longer to compile are completed and ready, these iterations may be programmed to the FPGA hardware to transparently replace the existing, less performant iteration.

In implementations herein, a data parallel programming compiler for a data parallel programming language of a data parallel programming model can provide multiple compilation iterations for an application program (or portions, such as kernels, of the application program. A data parallel programming runtime can initially program a faster-to-compile, but lower performance, compilation iteration on a region of an accelerator device, such as an FPGA device. Then, as the longer-to-compile, but better performing, compilation iterations complete and are available, the data parallel programming runtime can transparently reprogram the region of the accelerator device with these compilation iterations to provide for incremental evolution of the architecture materialized on the FPGA. Implementations provide for regional changes of architecture on the FPGA, such that the FPGA can have a heterogeneous set of architectures executing in different regions in parallel. In some implementations, profile-guided automation can guide which elements of the application program justify the compilation time of a more-customized architecture.

This disclosure introduces techniques that transform the flow and efficiency of FPGA high-level design development, reducing or eliminating compile time as the primary road-blocks to FPGA adoption in widespread markets. The aggregate of these techniques creates an improved, user-friendly compilation/development flow on FPGA (which is a primary blocker to use today), not only enabled through the incremental architectural evolution, but also automated to hide from the developer what would otherwise be significant design complexity. Implementations of the disclosure provide technical advantages such as, power reduction through incremental just-in-time compilations for the FPGA, driven by the data parallel programming runtime. Implementations herein can lead to substantial savings in power and increase competitive differentiation.

Figure 8:
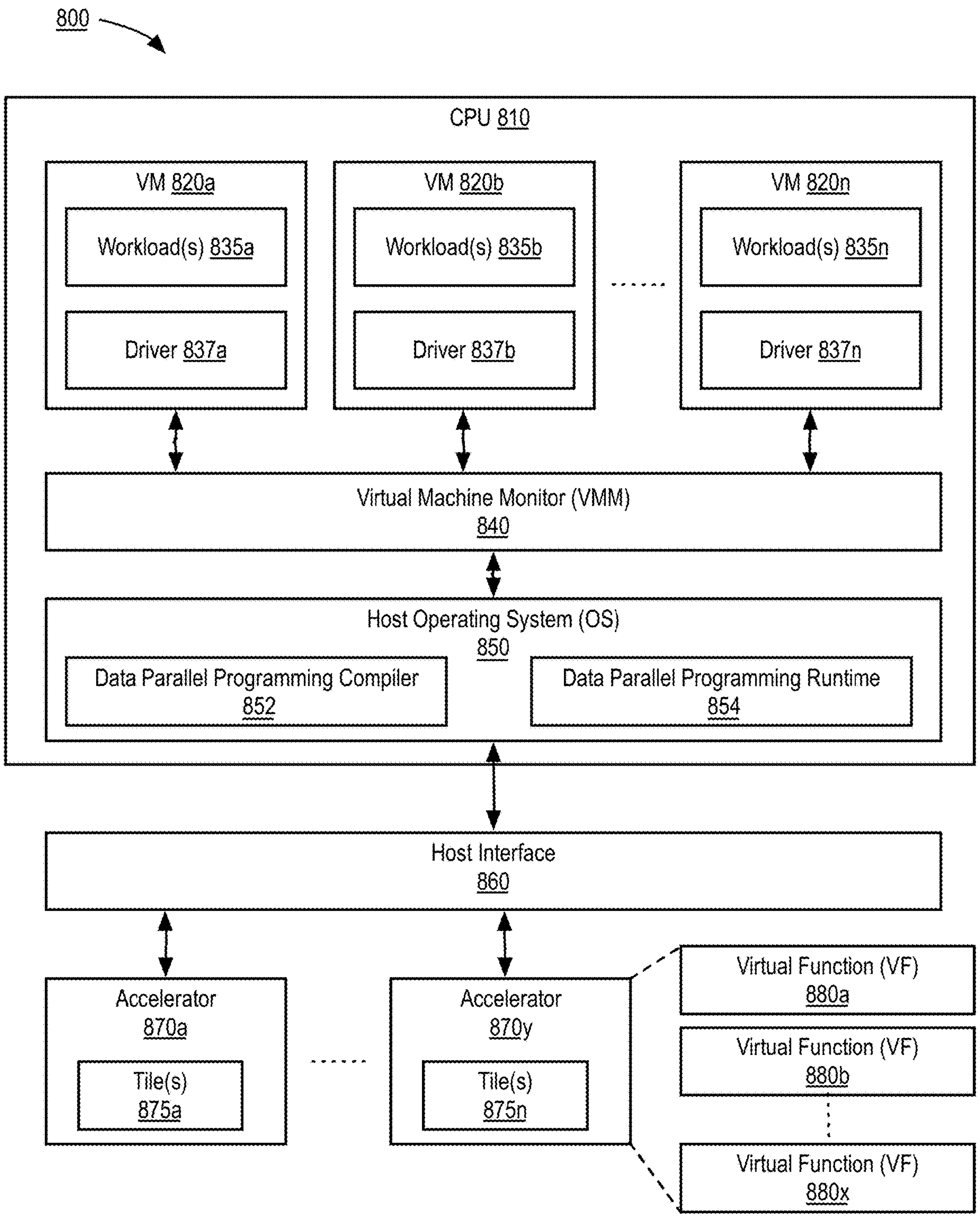
FIG. 8 is a block diagram illustrating a host system for incremental just-in-time (JIT) performance refinement for programmable logic device offload, according to some embodiments.

FIG. 8 is a block diagram illustrating a host system 800 for incremental just-in-time (JIT) performance refinement for programmable logic device offload, according to some embodiments. In some embodiments, host system 800 may include a computer platform hosting an integrated circuit ("IC"), such as a system on a chip ("SoC" or "SOC"), integrating various hardware and/or software components of host system 800 on a single chip.

As illustrated, in one embodiment, host system 800 may include any number and type of hardware and/or software components, such as (without limitation) central processing unit ("CPU" or simply "application processor" or "processor") 810, graphics processing unit ("GPU" or simply "graphics processor"), graphics driver (also referred to as "GPU driver", "graphics driver logic", "driver logic", user—mode driver (UMD), user —mode driver framework (UMDF), or simply "driver"), hardware accelerators 870*a-y* (such as programmable logic device 10 described above with respect to FIGS. 1-7 including, but not limited to, an FPGA, ASIC, a re-purposed CPU, or a re-purposed GPU, for example), memory, network devices, drivers, or the like, as well as input/output (I/O) sources, such as touchscreens, touch panels, touch pads, virtual or regular keyboards, virtual or regular mice, ports, connectors, etc. Host system 800 may include a host operating system (OS) 850 serving as an interface between hardware and/or physical resources of the host system 800 and a user.

It is to be appreciated that a lesser or more equipped system than the example described above may be utilized for certain implementations. Therefore, the configuration of host system 800 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In the context of the examples herein, the host system 800 is shown including a CPU 810 running a virtual machine monitor (VMM) 840 and host OS 850. The host system 800 may represent a server in a public, private, or hybrid cloud or may represent an edge server located at the edge of a given network to facilitate performance of certain processing physically closer to one or more systems or applications that are creating the data being stored on and/or used by the edge server.

In some implementations, although host system 800 is depicted as implementing a virtualization system to virtualize its resources (e.g., memory resources and processing resources), some implementations may execute applications and/or workload on host system 800 by directly utilizing the resources of host system 800, without implementation of a virtualization system.

Depending upon the particular implementation, the VMM 840 may be a bare metal hypervisor (e.g., Kernel-based Virtual Machine (KVM), ACRN, Vmware ESXi, Citrix XenServer, or Microsoft Hyper-V hypervisor) or may be a hosted hypervisor. The VMM 840 is responsible for allowing the host system 800 to support multiple VMs (e.g., 820*a-n*, collectively referred to herein a VMs 820) by virtually sharing its resources (e.g., memory resources and processing resources) for use by the VMs.

Each of the VMs 820 may run a guest operating system (OS) (e.g., Linux or Windows) as well as a driver (e.g., 837*a-n*) for interfacing with accelerators (e.g., accelerators 870*a-x*) compatible with one or more input/output (I/O) bus technologies (e.g., Accelerated Graphics Port (AGP), Peripheral Component Interconnect (PCI), PCI eXtended (PCI-X), PCI Express, Compute Express Link (CXL), or the like).

In the context of the example herein, a host operating system (OS) 850 is logically interposed between the VMM 840 and a host interface 860 (e.g., a serial or parallel expansion bus implementing one or more I/O bus technologies) and may be responsible for dynamically routing workloads (e.g., workloads 835*a-n*) of the VMs 820 to one or more hardware accelerators (e.g., accelerators 870*a-y*, collectively referred to herein as accelerators 870) coupled to the host system 800 via the host interface 860. The host OS 850 may include a data parallel programming compiler 852 and a data parallel programming runtime 854 to enable incremental just-in-time (JIT) performance refinement for programmable logic device offload. A non-limiting example of various functional units that might make up the data parallel programming compiler 852 and a data parallel programming runtime 854 is described below with reference to FIG. 9.

In some implementations, host system 800 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable. In some implementations, the accelerators 870 may be communicably coupled to host system 800 via the network interface device(s).

The accelerators 870 may represent one or more types of hardware accelerators (e.g., XPUs) to which various tasks (e.g., workloads 835*a-n*) may be offloaded from the CPU 810. For example, workloads 835*a-n* may include large AI and/or ML tasks that may be more efficiently performed by a graphics processing unit (GPU) than the CPU 810. In one embodiment, rather than being manufactured on a single piece of silicon, one or more of the accelerators may be made up of smaller integrated circuit (IC) blocks (e.g., tile(s) 875*a* and tiles(s) 875*m*), for example, that represent reusable IP blocks that are specifically designed to work with other similar IC blocks to form larger more complex chips (e.g., accelerators 870*a-y*). In some implementations, an accelerator 870 may include, but is not limited to, programmable logic device 10 described above with respect to FIGS. 1-7 including, but not limited to, an FPGA, ASIC, a re-purposed CPU, or a re-purposed GPU, for example.

In various examples described herein, slices of physical resources (not shown) of individual accelerators (e.g., at the tile level and/or at the accelerator level) may be predefined (e.g., via a configuration file associated with the particular accelerator) and exposed as Virtual Functions (VFs) (e.g., VFs 880*a-x*, collectively referred to herein as VFs 880). As described further below, incremental just-in-time (JIT) performance refinement for programmable logic device offload may be performed by the data parallel programming runtime 854 based on compiled iterations of an application program generated by a data parallel programming compiler 852. The data parallel programming runtime 854 may progressively program the compiled iterations to at least one accelerator device 870. In some implementations, the data parallel programming runtime 854 decides which compilation iterations to program to the accelerator device 870 based on maintained information, such as a task graph of the application program, and decides on when and how to program the compilation iterations to the accelerator device 870, as discussed further below with respect to FIGS. 9-12.

Embodiments may be provided, for example, as a computer program product which may include one or more machine—readable media having stored thereon machine executable instructions that, when executed by one or more machines such as a computer, network of computers, or other electronic devices, may result in the one or more machines carrying out operations in accordance with embodiments described herein. A machine—readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine—readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 9:
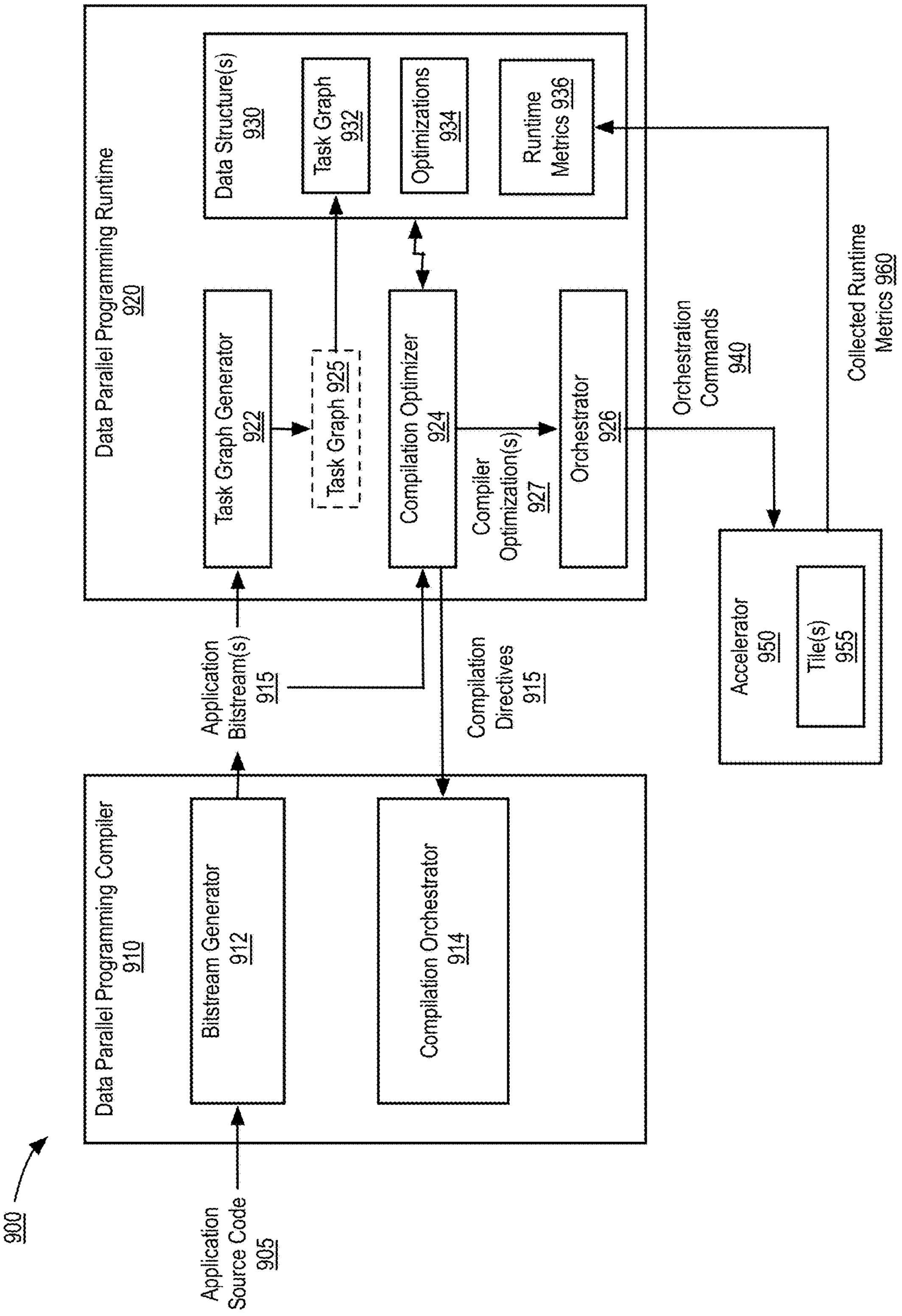
FIG. 9 illustrates a computing environment including a data parallel programming compiler and a data parallel programming runtime to implement incremental JIT performance refinement for programmable logic device offload, in accordance with implementation herein.

FIG. 9 illustrates a computing environment 900 including a data parallel programming compiler 910 and a data parallel programming runtime 920 to implement incremental JIT performance refinement for programmable logic device offload, in accordance with implementation herein. In one implementation, data parallel programming compiler 910 is the same as data parallel programming compiler 852 of FIG. 8 and data parallel programming runtime 920 is the same as data parallel programming runtime 854 of FIG. 8. In one implementation, computing environment 900 may be part of host system 800 of FIG. 8. For example, data parallel programming compiler 910 and a data parallel programming runtime 920 may be hosted by CPU 810 described with respect to FIG. 8. Furthermore, data parallel programming compiler 910 and a data parallel programming runtime 920 may be communicably coupled to accelerator 950, which may be the same as accelerator 870 of FIG. 8 in implementations herein. For brevity, many of the details already discussed with reference to FIG. 8 are not repeated or discussed hereafter.

As previously described, the use of hardware accelerators has enabled faster workload processing and has emerged as an effective architecture for acceleration of diverse workloads. Workload diversity in applications relies on architectural diversity in the underlying computing platform. A mix of scalar, vector, matrix, and spatial (SVMS) architectures deployed in CPU, GPU, AI, and field programable gate array (FPGA) accelerators can be used to provide the performance for the diverse workloads.

In an architectural diverse platform, coding for CPUs and accelerators rely on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as the DPC++ programming language. The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that best accelerates the workload. A host is available to simply development and debugging of device code.

Programmable logic devices, such as FPGAs, are fine grained spatial devices, and as a result compile times to generate binaries that can configure the hardware are slow, often on the order of a few to a few dozen hours per design iteration. Long compilation times prevent interactive development and optimization of applications for FPGA targets because a developer cannot achieve rapid feedback and has to effectively restart their code tuning freshly after each compile finishes (often on the following workday).

FPGAs can implement many different classes of architecture on the programmable fabric, that have differing performance and compile-time characteristics. In typical development flows, a fully custom dataflow architecture is implemented from the developer's high-level design entry code (such as OpenCL, SYCL, or DPC++), because such an implementation produces the best performance and power efficiency.

Implementations of the disclosure provide for incremental just-in-time performance refinement for programmable logic device offload, such as in the programmable logic devices described above with respect to FIGS. 1-7. FPGAs can be accessed through "offline compilation", in which case the many hour compilation is triggered by the developer and allowed to complete before the application is executed on FPGA hardware. A more interactive development flow becomes possible through just-in-time (JIT) or "online" compilation, where an FPGA program can be compiled during actual execution of an application and not ahead-of-time. Implementations herein refine the JIT compilation approach by compiling multiple iterations of an application (or portions (e.g., kernels) of an application) for incremental programming to the FPGA hardware. A fastest compiled iteration (with reduced performance capabilities) can be programmed to the FPGA hardware initially to allow for a quick execution of the application. When the iterations that take longer to compile are completed and ready, these iterations may be programmed to the FPGA hardware to transparently replace the existing, less performant iteration.

In implementations herein, a data parallel programming compiler for a data parallel programming language of a data parallel programming model can provide multiple compilation iterations for an application program (or portions, such as kernels, of the application program. A data parallel programming runtime can initially program a faster-to-compile, but lower performance, compilation iteration on a region of an accelerator device, such as an FPGA device. Then, as the longer-to-compile, but better performing, compilation iterations complete and are available, the data parallel programming runtime can transparently reprogram the region of the accelerator device with these compilation iterations to provide for incremental evolution of the architecture materialized on the FPGA. Implementations provide for regional changes of architecture on the FPGA, such that the FPGA can have a heterogeneous set of architectures executing in different regions in parallel. In some implementations, profile-guided automation can guide which elements of the application program justify the compilation time of a more-customized architecture.

With respect to FIG. 9, in one implementation, the data parallel programming compiler 910 (also referred to herein as compiler 910) may include, but is not limited to, a bitstream generator 912 and a compilation orchestrator 914. The data parallel programming runtime 920 (also referred to herein as runtime 920) may include, but is not limited to, a task graph generator 922, a compilation optimizer 924, an orchestrator 926, and data structure(s) 930. In implementations herein, the compiler 910 and/or the runtime 920, as well as their sub-components, may be implemented by hardware, software, firmware and/or any combination of hardware, software and/or firmware. Accelerator 950 may include one or more tile(s) 955 (which can be the same as tiles 875 of FIG. 8). In one implementation tile(s) 955 may refer to regions of an FPGA accelerator device that can be configured via PR.

As previously noted, implementations as described herein may refer to implementation in a spatial architecture, such as an FPGA. The discussion herein of FIG. 9 is made with reference to the accelerator 950 encompassing a spatial architecture of an FPGA device. However, other types of accelerator devices may be utilized in implementations of the disclosure and are not solely limited to an FPGA accelerator device and/or spatial architecture. FPGAs are spatial architectures, and therefore different regions of the device can be configured to perform different parts of a computation in a pipelined dataflow architecture.

In one implementation, the compiler 910 may receive application source code 905 for purposes of compilation. In one implementation the compiler 910 is a JIT compiler. The bitstream generator 912 may receive the application source code 905 and generate one or more application bitstreams 915 to provide to data parallel programming runtime 920. In implementations herein, a set of multiple application bitstreams 915 are compiled for the application source code 905. In some implementations, a set of multiple application bitstreams 915 are compiled for portions of the application source code 905, such as for each kernel of the application source code 905. A kernel may refer to a unit of computation in the data parallel programming model. A kernel may be as small as a single line of code or can encompass many lines of code (e.g., thousands of lines of code, etc.). In some implementations, the compilation iterations may be complied at a sub-kernel level.

In implementations herein, the sets of multiple application bitstreams 915 may be referred to as compilation iterations. The compilation iterations for application source code 905 (or the kernels of application source code 905) may include compilation for an instruction set architecture (ISA) soft processor (also referred to herein as a soft ISA processor compilation, soft ISA compilation, or soft ISA kernel), a ISA hardened processor, an overlay compilation, a soft coarse-grained reconfigurable array (CGRA) compilation, and a fully-customized datapath compilation (also referred to herein as a full custom compilation, full custom kernel, or custom dataflow architecture), to name a few examples. The range of compilation iteration options may include numerous different types of compilation iterations and implementations are not solely limited to the examples discussed herein. The compilation iterations provide varying levels of compilation time with associated performance tradeoff on the accelerator device 950. For example, the soft ISA processor compilation may have a short compilation time on the order of a few seconds, but may provide lower performance as compared to other compilation iterations having longer compilation times.

In one example embodiment, a pre-compiled instruction-set architecture (ISA) soft processor or set of processors can be packaged by the compiler 910 along with a soft ISA processor compilation (e.g., application bitstream 915) for the soft ISA processor. The ISA soft processor may be the initial compilation target of the application source code 905 (or a kernel of the application source code 905), with typical compiles for the soft ISA processor target being only a few seconds. The pre-compiled ISA processor bitstream 915 (shipping with the compiler 910) can be directly programmed to accelerator 950 as the initially programming for a region (e.g., tile 955) of the accelerator 950. The application program can begin executing with reduced performance (e.g., reduced throughput and power efficiency as compared to a many hour custom dataflow compilation). However, even with reduced performance, the application program can execute on real accelerator 950 hardware in-situ with line-rate input and output interfaces, enabling the program to be tested and debugged with high fidelity.

Simultaneously with generation of the soft ISA processor compilation, the compiler 910 may automatically generate one or more other compilation iterations, such as an intermediate soft CRGA compilation (e.g., having a few minute compilation time) and/or a full custom dataflow architecture compilation (e.g., having many hour compilation time). When the one or more other compilation iterations are completed, the corresponding application bitstream 915 can be programmed, by the runtime 920, to the accelerator 950 (e.g., FPGA) to leverage the performance and power efficiency increases of the intermediate design and/or the fully customized design.

In one implementation, the compilation optimizer 924 of the runtime 920 may receive the application bitstream 915 of the one or more compilation iterations and cause the application bitstream to be programmed to the accelerator 950. In implementations herein, the orchestrator 926 may also be referred to as a scheduler. The orchestrator 926 can provides orchestration commands 940 to accelerator 950 to cause the accelerator 950 to be programmed with the particular compiler iteration identified by compilation optimizer 924. The orchestration commands 940 may include commands to program a region (e.g., tile 955) of the accelerator 950 with the compilation iteration.

In some implementations, the compilation optimizer 924 may utilize a task graph 925 generated by task graph generator 922 to guide and inform the reprogramming of a region of the accelerator 950 via compiler optimization(s) 927. The task graph generator 922 can create the task graph 925 based on the application bitstream 915 generated by compiler 910. The task graph 925 is a representation of the relationships and dependencies existing in the application source code 905 as represented by the application bitstream 915. As such, the task graph 925 can provide information on how quickly kernels should complete based on downstream data and control dependencies. In one implementation, the task graph 925 may be stored in an internal data structure 930 of the runtime 920 as task graph 932.

In some implementations, PR can be leveraged to incrementally replace regions of the FPGA spatial design (e.g., one kernel at a time) as partial compiles complete, providing incremental/monotonically increasing performance on the accelerator 950. For such reconfiguration, the orchestration commands 940 sent by orchestrator 926 may include commands to cause memory contents and state of the region being reprogrammed to be transferred from the accelerator 950 to a host system prior to the reprogramming, as well as commands to cause the memory contents and state to be restored to the region of the accelerator 950 after reprogramming. These orchestration commands 940 make the transition of architecture in the region of the accelerator 950 transparent to an end user/developer, except in performance metrics.

In one implementation, profiling metrics can be extracted from the initial soft processor ISA execution as collected runtime metrics 960. Such collected runtime metrics 960 may be maintained in one or more internal data structures 930 of the runtime 920 as runtime metrics 936. The runtime metrics 936 can be used to identify hotspots within the real in-situ execution (with real data), with hotspots flagging code where more expensive compilation to a custom dataflow architecture may be justified. In some implementations, code paths or kernels not commonly executed and therefore not identified as hotspots may continue to execute on a less performant compilation iteration (e.g., on the soft ISA processor) to limit compilation time, and to expose more FPGA spatial resources to the hotspots that do justify custom compilation. In one implementation, the hotspot can include, but is not limited to, a runtime latency of the kernel program exceeding a determined latency threshold or a runtime throughout of the kernel program exceeding a determined throughput threshold.

Forcing the developer to predict hotspots can lead to suboptimal implementations in most cases due to imperfect developer knowledge, and often data-dependent hotspots that are not tractable to predict and should be observed in-situ. In implementations herein, the hotspot detection using collected runtime metrics 960 utilizes the profile data to automate decisions on which kernels and which code regions justify full customization of architecture, and provides a net reduction in compile time by not forcing all elements of the design to incur costly compiles which do not actually provide performance benefit. In implementations herein, if the compilation optimizer 924 determines that a particular compilation iteration that is in place in the accelerator 950 is sufficient and is not to be incrementally evolved to any further iteration compilations, the compilation optimizer 924 may send a compilation directive 915 (e.g., a command) to the compilation orchestrator of the compiler 910 to inform the compiler 910 to terminate any in-progress compilation iterations for the application code (e.g., kernel) associated with the particular region of the accelerator 950.

In some implementations, an intermediate architecture or architectures could automatically be inserted between the initial architecture (e.g., soft ISA processor architecture) execution and the fully custom dataflow architecture. Such intermediate architectures would provide an intermediate solution with intermediate compile times (e.g., seconds to hours), and with moderately increased performance over the ISA processor. By inserting the intermediate architecture between the initial architecture and the full custom architecture, a moderate improvement in performance is provided to the accelerator 950, while the fidelity of hotspot detection at in-situ line rates are also improved. Example intermediate architectures include regional overlays and soft implementations of CGRA.

In one implementation, an overlay may refer to an FPGA programming bitstream that maintains configurability of spatial resources, usually at a coarser granularity than the raw FPGA resources, and that can be configured through an additional layer of bitstream or instruction stream on top of the base overlay bitstream which is programmed to the FPGA hardware. The second layer of configurability usually aims to provide faster user compilation experiences, but the available second layer of configurability is restricted to flexibility/configurability built into the base overlay design. Overlays are often built for specific application domains so that appropriate configurability for a specific application can be built, without too much overhead in area or frequency loss.

As noted above, the transition to a new architecture of a new compilation iteration can be made transparent to the user with FPGA state transferred to the host device before programming, and restored after programming. Regions of the accelerator 950 can be incrementally updated with the new architecture through partial reconfiguration mechanisms.

Hotspot intensity in runtime metrics 936 can be used to determine which components of an FPGA design should execute on the variety of compilation iteration architectures, such that the FPGA design, after some period of iterative compilation, can contain a heterogeneous set of architectures, ranging from non-performant soft ISA, through intermediate performance solutions such as a soft CGRA or regional overlays for medium intensity hotspots, to fully customized datapath regions for the strongest hotspots.

Figure 10:
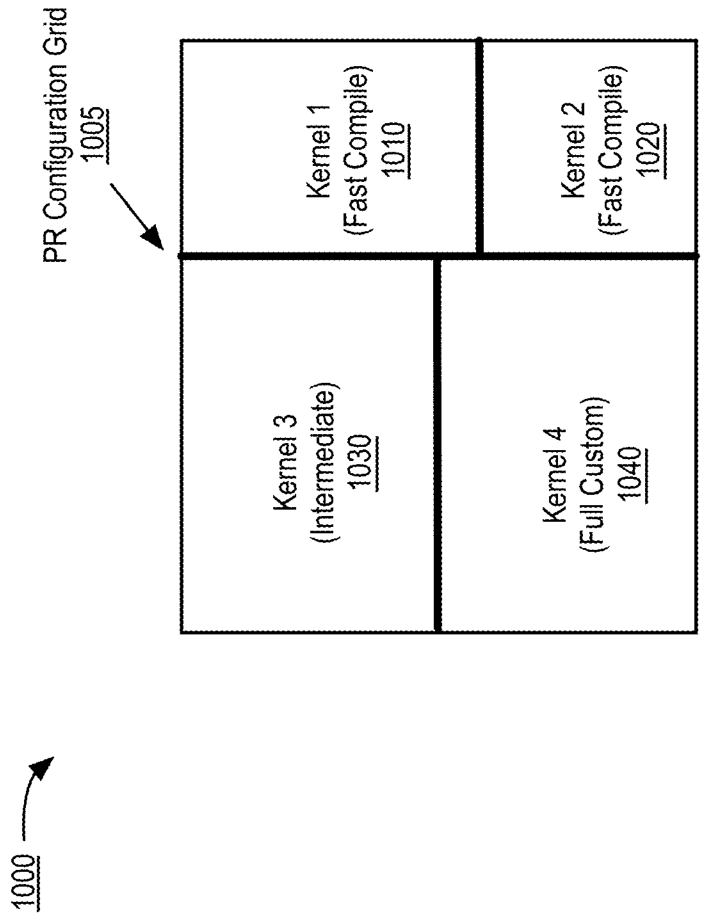
FIG. 10 illustrates an accelerator device having an example placement of heterogeneous architecture regions used to implement different kernels or regions of kernels, in accordance with implementations of the disclosure.

FIG. 10 illustrates an accelerator device 1000 having an example placement of heterogeneous architecture regions used to implement different kernels or regions of kernels, in accordance with implementations of the disclosure. In one implementation, accelerator device 1000 is a FPGA. The FPGA 1000 can include a plurality of regions delineated by a PR configuration grid 1005. Each region can be programmed to run a kernel of an application program. As illustrated, one region of FPGA 1000 hosts kernel 1 1010, another region hosts kernel 2 1020, another region hosts kernel 3 1030, and a fourth region hosts kernel 4 1040. Kernels 1010-1040 may host heterogenous architecture regions supported by the compilation iterations discussed above. For example, in some implementations, kernels 1010-1040 identified as in-situ performance hotspots can incur additional compile times toward increasingly customized architectures, such as kernel 3 1030 hosting an intermediate architecture such as an overlay or a soft CGRA and kernel 4 1040 hosting a full custom architecture. Kernel 1 1010 and kernel 2 1020 may be select to retain a fast compile architecture, such as a soft ISA processor compilation architecture. The heterogeneous architecture placements provided by implementations herein can result in compile times and resources automatically applied to those kernels 1010-1040 that impact overall design performance.

Output of the heterogeneous/hybrid architectural design point can be cached in optimizations 934 of data structure 930 for use in future program executions, such that the regions of the design with new code changes request additional iterative compilation, while those regions without code changes do not request such additional iterative compilation.

As previously noted, implementations of the disclosure may improve the time to market and user interface experience for programmable logic devices, such as FPGAs. Furthermore, implementations can provide an approach to generating a homogeneous environment for evaluation, such as by generating kernels in a homogeneous way to FPGAs in order to create a homogeneous environment. In addition, implementations herein can provide for additional failure recovery options by providing for a soft ISA processor environment in the FPGA that can be a fallback position to utilize if a portion of the FPGA experiences a failure condition, instead of relying on a hard stop option.

In some example implementations, techniques herein can be utilized to emulate feature sets in upcoming generations of computing hardware for early evaluation. For example, the soft ISA processor can be configured to emulated N+1, N+2 feature sets. Furthermore, in some implementations, techniques herein can utilize automatic machine learning (AutoML) towards FPA design abstraction code (e.g., register-transfer-level (RTL) code) generation with data parallel programming (e.g., DPC++) for ease of FPGA adoption, as well as quick evaluation (e.g., Intel® XuCode-based emulation support for DPC++ for CPUs). In some implementations, techniques herein can work without or without trusted execution environments (TEE) to be resilient against any malicious reconfiguration.

FIG. 11 is a flow diagram illustrating a method 1100 for incremental just-in-time (JIT) performance refinement for programmable logic device offload, in accordance with implementations of the disclosure. Method 1100 may be performed by processing logic that may comprise hardware (e.g., circuitry, dedicated logic, programmable logic, etc.), software (such as instructions run on a processing device), or a combination thereof. More particularly, the method 1100 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 1100 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 8-10 may not be repeated or discussed hereafter. In one implementation, a processor implementing a runtime, such as a processor 810 implementing data paralleling programming runtime 854 or data parallel programming runtime 920 described with respect to FIGS. 8-9, may perform method 1100.

Method 1100 begins at block 1110 where the processor may start just-in-time compilation of fast compile architecture, intermediate compile architecture, and full custom datapath compile architecture for kernel program of an application. At block 1120, the processor may program the fast compile architecture to FPGA region and execute kernel program on the fast compile architecture in the FPGA region. Then, at decision block 1130, the processors determine whether the kernel is a hotspot that could be accelerated. If not, then method 1100 proceeds to block 1140, where the processor continues executing on fast compile machine and then returns to block 1120.

On the other hand, if at decision block 1130, the kernel is a hotspot that should be accelerated, then method 1100 proceeds to block 1150 where the processor may program the intermediate compile architecture to the FPGA region and execute the kernel program on the intermediate compile architecture in the FPGA region. In implementations herein, the intermediate compile architecture can include a single intermediate stage or can include multiple intermediate stages, such as, for example, overlay and/or soft CGRA implementations. At decision block 1160, the processor again determines whether the kernel is a hotspot that could be accelerated. If not, then method 1100 proceeds to block 1170, where the processor continues executing on the current architecture and then returns to block 1150.

On the other hand, if at decision block 1160, the kernel is a hotspot that could be accelerated, then method 1100 proceeds to block 1180 where the processor may program the full custom datapath compile architecture to the FPGA region and execute the kernel program on the full custom datapath compile architecture in the FPGA region.

FIG. 12 is a flow diagram illustrating a method 1200 for transparent reconfiguration as part of incremental JIT performance refinement for programmable logic device offload, in accordance with implementations of the disclosure. Method 1200 may be performed by processing logic that may comprise hardware (e.g., circuitry, dedicated logic, programmable logic, etc.), software (such as instructions run on a processing device), or a combination thereof. More particularly, the method 1200 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 1200 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 8-11 may not be repeated or discussed hereafter. In one implementation, a processor implementing a runtime, such as a processor 810 implementing data paralleling programming runtime 854 or data parallel programming runtime 920 described with respect to FIGS. 8-9, may perform method 1200.

Method 1200 begins at block 1210 where the processor may determine that a new compilation iteration of a kernel program of an application is ready for programming to a region of a programmable logic device. In one implementation, the region of the programmable logic device can be currently executing a different compilation iteration of the kernel program. At block 1220, the processor may orchestrate, based on a task graph of the application, a re-programming operation to reconfigure the region.

Then, at block 1230, the processor may save the state and memory of the kernel program. At block 1240, the processor may reprogram the region with the new compilation iteration of the kernel program to the region.

Subsequently, at block 1250, the processor may transfer the state and the memory of the kernel program to the region with the new compilation iteration. Lastly, at block 1260, the processor may execute the kernel program on region with the new compilation iteration.

Figure 13:
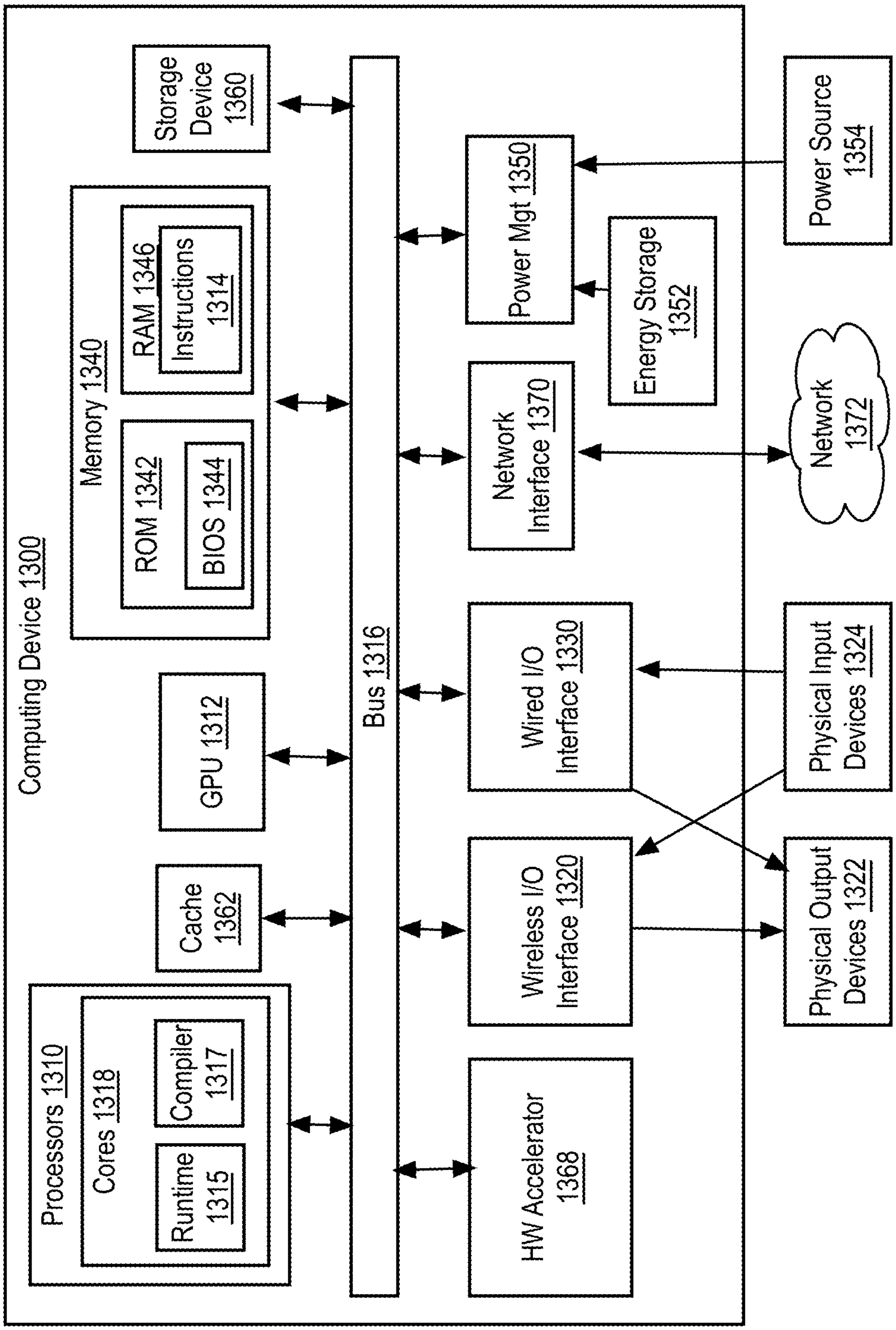
FIG. 13 is a schematic diagram of an illustrative electronic computing device to enable incremental JIT performance refinement for programmable logic device offload, according to some embodiments.

FIG. 13 is a schematic diagram of an illustrative electronic computing device 1300 to enable incremental JIT performance refinement for programmable logic device offload, according to some embodiments. In some embodiments, the computing device 1300 includes one or more processors 1310 including one or more processors cores 1318 including a runtime 1315 and a compiler 1317, such as a data parallel programming runtime 854, 920 and data parallel programming compiler 852, 910 described with respect to FIGS. 8 and 9, respectively. In some embodiments, the computing device is to provide incremental JIT performance refinement for programmable logic device offload, as provided in FIGS. 1-12.

The computing device 1300 may additionally include one or more of the following: cache 1362, a graphical processing unit (GPU) 1312 (which may be the hardware accelerator in some implementations), a wireless input/output (I/O) interface 1320, a wired I/O interface 1330, system memory 1340 (e.g., memory circuitry), power management circuitry 1350, non-transitory storage device 1360, and a network interface 1370 for connection to a network 1372. The following discussion provides a brief, general description of the components forming the illustrative computing device 1300. Example, non-limiting computing devices 1300 may include a desktop computing device, blade server device, workstation, or similar device or system.

In embodiments, the processor cores 1318 are capable of executing machine-readable instruction sets 1314, reading data and/or instruction sets 1314 from one or more storage devices 1360 and writing data to the one or more storage devices 1360. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 1318 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1300 includes a bus or similar communications link 1316 that communicably couples and facilitates the exchange of information and/or data between various system components including the processor cores 1318, the cache 1362, the graphics processor circuitry 1312, one or more wireless I/O interfaces 1320, one or more wired I/O interfaces 1330, one or more storage devices 1360, and/or one or more network interfaces 1370. The computing device 1300 may be referred to in the singular herein, but this is not intended to limit the embodiments to a single computing device 1300, since in certain embodiments, there may be more than one computing device 1300 that incorporates, includes, or contains any number of communicably coupled, collocated, or remote networked circuits or devices.

The processor cores 1318 may include any number, type, or combination of currently available or future developed devices capable of executing machine-readable instruction sets.

The processor cores 1318 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 13 are of conventional design. Consequently, such blocks are not described in further detail herein, as they can be understood by those skilled in the relevant art. The bus 1316 that interconnects at least some of the components of the computing device 1300 may employ any currently available or future developed serial or parallel bus structures or architectures.

The system memory 1340 may include read-only memory ("ROM") 1342 and random access memory ("RAM") 1346. A portion of the ROM 1342 may be used to store or otherwise retain a basic input/output system ("BIOS") 1344. The BIOS 1344 provides basic functionality to the computing device 1300, for example by causing the processor cores 1318 to load and/or execute one or more machine-readable instruction sets 1314. In embodiments, at least some of the one or more machine-readable instruction sets 1314 cause at least a portion of the processor cores 1318 to provide, create, produce, transition, and/or function as a dedicated, specific, and particular machine, for example a word processing machine, a digital image acquisition machine, a media playing machine, a gaming system, a communications device, a smartphone, or similar.

The computing device 1300 may include at least one wireless input/output (I/O) interface 1320. The at least one wireless I/O interface 1320 may be communicably coupled to one or more physical output devices 1322 (tactile devices, video displays, audio output devices, hardcopy output devices, etc.). The at least one wireless I/O interface 1320 may communicably couple to one or more physical input devices 1324 (pointing devices, touchscreens, keyboards, tactile devices, etc.). The at least one wireless I/O interface 1320 may include any currently available or future developed wireless I/O interface. Example wireless I/O interfaces include, but are not limited to: BLUETOOTH®, near field communication (NFC), and similar.

The computing device 1300 may include one or more wired input/output (I/O) interfaces 1330. The at least one wired I/O interface 1330 may be communicably coupled to one or more physical output devices 1322 (tactile devices, video displays, audio output devices, hardcopy output devices, etc.). The at least one wired I/O interface 1330 may be communicably coupled to one or more physical input devices 1324 (pointing devices, touchscreens, keyboards, tactile devices, etc.). The wired I/O interface 1330 may include any currently available or future developed I/O interface. Example wired I/O interfaces include, but are not limited to: universal serial bus (USB), IEEE 1394 ("FireWire"), and similar.

The computing device 1300 may include one or more communicably coupled, non-transitory, data storage devices 1360. The data storage devices 1360 may include one or more hard disk drives (HDDs) and/or one or more solid-state storage devices (SSDs). The one or more data storage devices 1360 may include any current or future developed storage appliances, network storage devices, and/or systems. Non-limiting examples of such data storage devices 1360 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1360 may include one or more removable storage devices, such as one or more flash drives, flash memories, flash storage units, or similar appliances or devices capable of communicable coupling to and decoupling from the computing device 1300.

The one or more data storage devices 1360 may include interfaces or controllers (not shown) communicatively coupling the respective storage device or system to the bus 1316. The one or more data storage devices 1360 may store, retain, or otherwise contain machine-readable instruction sets, data structures, program modules, data stores, databases, logical structures, and/or other data useful to the processor cores 1318 and/or graphics processor circuitry 1312 and/or one or more applications executed on or by the processor cores 1318 and/or graphics processor circuitry 1312. In some instances, one or more data storage devices 1360 may be communicably coupled to the processor cores 1318, for example via the bus 1316 or via one or more wired communications interfaces 1330 (e.g., Universal Serial Bus or USB); one or more wireless communications interfaces 1320 (e.g., Bluetooth®, Near Field Communication or NFC); and/or one or more network interfaces 1370 (IEEE 802.3 or Ethernet, IEEE 802.11, or Wi-Fi®, etc.).

Processor-readable instruction sets 1314 and other programs, applications, logic sets, and/or modules may be stored in whole or in part in the system memory 1340. Such instruction sets 1314 may be transferred, in whole or in part, from the one or more data storage devices 1360. The instruction sets 1314 may be loaded, stored, or otherwise retained in system memory 1340, in whole or in part, during execution by the processor cores 1318 and/or graphics processor circuitry 1312.

The computing device 1300 may include power management circuitry 1350 that controls one or more operational aspects of the energy storage device 1352. In embodiments, the energy storage device 1352 may include one or more primary (i.e., non-rechargeable) or secondary (i.e., rechargeable) batteries or similar energy storage devices. In embodiments, the energy storage device 1352 may include one or more supercapacitors or ultracapacitors. In embodiments, the power management circuitry 1350 may alter, adjust, or control the flow of energy from an external power source 1354 to the energy storage device 1352 and/or to the computing device 1300. The power source 1354 may include, but is not limited to, a solar power system, a commercial electric grid, a portable generator, an external energy storage device, or any combination thereof.

For convenience, the processor cores 1318, the graphics processor circuitry 1312, the wireless I/O interface 1320, the wired I/O interface 1330, the storage device 1360, and the network interface 1370 are illustrated as communicatively coupled to each other via the bus 1316, thereby providing connectivity between the above-described components. In alternative embodiments, the above-described components may be communicatively coupled in a different manner than illustrated in FIG. 13. For example, one or more of the above-described components may be directly coupled to other components, or may be coupled to each other, via one or more intermediary components (not shown). In another example, one or more of the above-described components may be integrated into the processor cores 1318 and/or the graphics processor circuitry 1312. In some embodiments, all or a portion of the bus 1316 may be omitted and the components are coupled directly to each other using suitable wired or wireless connections.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11 and/or 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase “at least one of A or B” is intended to refer to implementations including any of (1) at least one A, (2) at least one B, and (3) at least one A and at least one B.

As used herein, singular references (e.g., “a”, “an”, “first”, “second”, etc.) do not exclude a plurality. The term “a” or “an” entity, as used herein, refers to one or more of that entity. The terms “a” (or “an”), “one or more”, and “at least one” can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors “first,” “second,” “third,” etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for ease of referencing multiple elements or components.

The following examples pertain to further embodiments. Example 1 is an apparatus to facilitate incremental JIT performance refinement for programmable logic device offload. The apparatus of Example 1 comprises a processor to: initiate multiple just-in-time (JIT) compilation iterations of an application; program a first architecture of a first compilation of the multiple JIT compilation iterations to a programmable logic device and execute the application on the first architecture, wherein the first compilation comprises a faster compilation time amongst the multiple JIT compilation iterations; identify a hotspot; determine that a second compilation of the multiple JIT compilation iterations is complete, wherein the second compilation comprises a slower compilation time than the first compilation; and program a second architecture of the second compilation of the multiple JIT compilation iterations to the programmable logic device and execute the application on the second architecture.

In Example 2, the subject matter of Example 1 can optionally include wherein a data parallel programming runtime is to perform the initiating, the programming the first architecture, the identifying, the determining, and the programming the second architecture. In Example 3, the subject matter of any one of Examples 1-2 can optionally include wherein a data parallel programming compiler to generate the multiple JIT compilation iterations of the application. In Example 4, the subject matter of any one of Examples 1-3 can optionally include wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation.

In Example 5, the subject matter of any one of Examples 1-4 can optionally include wherein the hotspot comprises at least one of a runtime latency of the application exceeding a determined latency threshold or a runtime throughout of the application exceeding a determined throughput threshold. In Example 6, the subject matter of any one of Examples 1-5 can optionally include wherein the data parallel programming runtime is further to orchestrate, based on a task graph of the application, a re-programming operation to reconfigure a region of the programmable logic device. In Example 7, the subject matter of any one of Examples 1-6 can optionally include wherein the data parallel programming runtime is to generate the task graph of the application using compiled code of the application, the task graph to represent at least one of a relationship or dependency of the code.

In Example 8, the subject matter of any one of Examples 1-7 can optionally include wherein the processor is further to terminate one or more of the multiple JIT compilation iterations for the application in response to determining that one of the multiple JIT compilation iterations is to remain programmed on the programmable logic device. In Example 9, the subject matter of any one of Examples 1-8 can optionally include wherein the programmable logic device comprises at least one a graphic processing unit (GPU), a central processing unit (CPU), or a programmable integrated circuit (IC). In Example 10, the subject matter of any one of Examples 1-9 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 11 is a method for facilitating incremental JIT performance refinement for programmable logic device offload. The method of Example 11 can include initiating, by a processor, multiple just-in-time (JIT) compilation iterations of an application; programming, by the processor, a first architecture of a first compilation of the multiple JIT compilation iterations to a programmable logic device and execute the application on the first architecture, wherein the first compilation comprises a faster compilation time amongst the multiple JIT compilation iterations; identifying a hotspot; determining that a second compilation of the multiple JIT compilation iterations is complete, wherein the second compilation comprises a slower compilation time than the first compilation; and programming, by the processor, a second architecture of the second compilation of the multiple JIT compilation iterations to the programmable logic device and execute the application on the second architecture.

In Example 12, the subject matter of Example 11 can optionally include wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation. In Example 13, the subject matter of Examples 11-12 can optionally include wherein the hotspot comprises at least one of a runtime latency of the application exceeding a determined latency threshold or a runtime throughout of the application exceeding a determined throughput threshold.

In Example 14, the subject matter of Examples 11-13 can optionally include wherein a data parallel programming runtime of the processor is further to orchestrate, based on a task graph of the application, a re-programming operation to reconfigure a region of the programmable logic device, and wherein the data parallel programming runtime is to generate the task graph of the application using compiled code of the application, the task graph to represent at least one of a relationship or a dependency of the code. In Example 15, the subject matter of Examples 11-14 can optionally include wherein the processor is further to terminate one or more of the multiple JIT compilation iterations for the application in response to determining that one of the multiple JIT compilation iterations is to remain programmed on the programmable logic device.

Example 16 is a non-transitory computer-readable storage medium for facilitating incremental JIT performance refinement for programmable logic device offload. The non-transitory computer-readable storage medium of Example 16 having stored thereon executable computer program instructions that, when executed by one or more processors, cause the one or more processors to perform operations comprising: initiate multiple just-in-time (JIT) compilation iterations of an application; program a first architecture of a first compilation of the multiple JIT compilation iterations to a programmable logic device and execute the application on the first architecture, wherein the first compilation comprises a faster compilation time amongst the multiple JIT compilation iterations; identify a hotspot; determine that a second compilation of the multiple JIT compilation iterations is complete, wherein the second compilation comprises a slower compilation time than the first compilation; and program a second architecture of the second compilation of the multiple JIT compilation iterations to the programmable logic device and execute the application on the second architecture.

In Example 17, the subject matter of Example 16 can optionally include wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation. In Example 18, the subject matter of Examples 16-17 can optionally include wherein the hotspot comprises at least one of a runtime latency of the application exceeding a determined latency threshold or a runtime throughout of the application exceeding a determined throughput threshold.

In Example 19, the subject matter of Examples 16-18 can optionally include wherein a data parallel programming runtime of the at least one processor is further to orchestrate, based on a task graph of the application, a re-programming operation to reconfigure a region of the programmable logic device, and wherein the data parallel programming runtime is to generate the task graph of the application using compiled code of the application, the task graph to represent at least one of a relationship or dependency of the code. In Example 20, the subject matter of Examples 16-19 can optionally include wherein the processor is further to terminate one or more of the multiple JIT compilation iterations for the application in response to determining that one of the multiple JIT compilation iterations is to remain programmed on the programmable logic device.

Example 21 is a system for facilitating incremental JIT performance refinement for programmable logic device offload. The system of Example 21 can optionally include a memory to store a block of data, and a processor communicably coupled to the memory to: initiate multiple just-in-time (JIT) compilation iterations of an application; program a first architecture of a first compilation of the multiple JIT compilation iterations to a programmable logic device and execute the application on the first architecture, wherein the first compilation comprises a faster compilation time amongst the multiple JIT compilation iterations; identify a hotspot; determine that a second compilation of the multiple JIT compilation iterations is complete, wherein the second compilation comprises a slower compilation time than the first compilation; and program a second architecture of the second compilation of the multiple JIT compilation iterations to the programmable logic device and execute the application on the second architecture.

In Example 22, the subject matter of Example 21 can optionally include wherein a data parallel programming runtime is to perform the initiating, the programming the first architecture, the identifying, the determining, and the programming the second architecture. In Example 23, the subject matter of any one of Examples 21-22 can optionally include wherein a data parallel programming compiler to generate the multiple JIT compilation iterations of the application. In Example 24, the subject matter of any one of Examples 21-23 can optionally include wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation.

In Example 25, the subject matter of any one of Examples 21-24 can optionally include wherein the hotspot comprises at least one of a runtime latency of the application exceeding a determined latency threshold or a runtime throughout of the application exceeding a determined throughput threshold. In Example 26, the subject matter of any one of Examples 21-25 can optionally include wherein the data parallel programming runtime is further to orchestrate, based on a task graph of the application, a re-programming operation to reconfigure a region of the programmable logic device. In Example 27, the subject matter of any one of Examples 21-26 can optionally include wherein the data parallel programming runtime is to generate the task graph of the application using compiled code of the application, the task graph to represent at least one of a relationship or a dependency of the code.

In Example 28, the subject matter of any one of Examples 21-27 can optionally include wherein the processor is further to terminate one or more of the multiple JIT compilation iterations for the application in response to determining that one of the multiple JIT compilation iterations is to remain programmed on the programmable logic device. In Example 29, the subject matter of any one of Examples 21-28 can optionally include wherein the programmable logic device comprises at least one a graphic processing unit (GPU), a central processing unit (CPU), or a programmable integrated circuit (IC). In Example 30, the subject matter of any one of Examples 21-29 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 31 is an apparatus for facilitating incremental JIT performance refinement for programmable logic device offload, comprising means for initiating multiple just-in-time (JIT) compilation iterations of an application; means for programming a first architecture of a first compilation of the multiple JIT compilation iterations to a programmable logic device and execute the application on the first architecture, wherein the first compilation comprises a faster compilation time amongst the multiple JIT compilation iterations; means for identifying a hotspot; means for determining that a second compilation of the multiple JIT compilation iterations is complete, wherein the second compilation comprises a slower compilation time than the first compilation; and means for programming a second architecture of the second compilation of the multiple JIT compilation iterations to the programmable logic device and execute the application on the second architecture. In Example 32, the subject matter of Example 31 can optionally include the apparatus further configured to perform the method of any one of the Examples 12 to 15.

Example 33 is at least one machine readable medium comprising a plurality of instructions that in response to being executed on a computing device, cause the computing device to carry out a method according to any one of Examples 11-15. Example 34 is an apparatus for facilitating incremental JIT performance refinement for programmable logic device offload, configured to perform the method of any one of Examples 11-15. Example 35 is an apparatus for facilitating incremental JIT performance refinement for programmable logic device offload, comprising means for performing the method of any one of Examples 11 to 15. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:

a processor to:

initiate multiple just-in-time (JIT) compilation iterations of an application, wherein a data parallel programming compiler to generate the multiple JIT compilation iterations of the application;

program a first architecture of a first compilation of the multiple JIT compilation iterations to a programmable logic device;

execute the application on the first architecture, wherein the first compilation comprises a faster compilation time amongst the multiple JIT compilation iterations;

identify a hotspot corresponding to a runtime metric of the application meeting a threshold condition;

determine that a second compilation of the multiple JIT compilation iterations is complete, wherein the second compilation comprises a slower compilation time than the first compilation;

program a second architecture of the second compilation of the multiple JIT compilation iterations to the programmable logic device; and execute the application on the second architecture.

2. The apparatus of claim 1, wherein a data parallel programming runtime is to perform the initiating, the programming the first architecture, the identifying, the determining, and the programming the second architecture.

3. The apparatus of claim 2, wherein the data parallel programming runtime is further to orchestrate, based on a task graph of the application, a re-programming operation to reconfigure a region of the programmable logic device.

4. The apparatus of claim 3, wherein the data parallel programming runtime is to generate the task graph of the application using compiled code of the application, the task graph to represent at least one of a relationship or dependency of the code.

5. The apparatus of claim 1, wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation.

6. The apparatus of claim 1, wherein the runtime metric of the application meeting the threshold condition comprises at least one of a runtime latency of the application exceeding a determined latency threshold or a runtime throughout of the application exceeding a determined throughput threshold.

7. The apparatus of claim 1, wherein the processor is further to terminate one or more of the multiple JIT compilation iterations for the application in response to determining that one of the multiple JIT compilation iterations is to remain programmed on the programable logic device.

8. The apparatus of claim 1, wherein the programmable logic device comprises at least one a graphic processing unit (GPU), a central processing unit (CPU), or a programmable integrated circuit (IC).

9. The apparatus of claim 8, wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EE-PLD), a logic cell array (LCA), or a complex programmable logic devices (CPLD).

10. A method comprising:

initiating, by a processor, multiple just-in-time (JIT) compilation iterations of an application, wherein a data parallel programming compiler to generate the multiple JIT compilation iterations of the application;

programming, by the processor, a first architecture of a first compilation of the multiple JIT compilation iterations to a programmable logic device;

executing the application on the first architecture, wherein the first compilation comprises a faster compilation time amongst the multiple JIT compilation iterations;

identifying a hotspot corresponding to a runtime metric of the application meeting a threshold condition;

determining that a second compilation of the multiple JIT compilation iterations is complete, wherein the second compilation comprises a slower compilation time than the first compilation;

programming, by the processor, a second architecture of the second compilation of the multiple JIT compilation iterations to the programmable logic device; and executing the application on the second architecture.

11. The method of claim 10, wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation.

12. The method of claim 11, wherein a data parallel programming runtime of the processor is further to orchestrate, based on a task graph of the application, a re-programming operation to reconfigure a region of the programmable logic device, and wherein the data parallel programming runtime is to generate the task graph of the application using compiled code of the application, the task graph to represent at least one of a relationship or dependency of the code.

13. The method of claim 10, wherein the runtime metric of the application meeting the threshold condition comprises at least one of a runtime latency of the application exceeding a determined latency threshold or a runtime throughout of the application exceeding a determined throughput threshold.

14. The method of claim 10, wherein the processor is further to terminate one or more of the multiple JIT compilation iterations for the application in response to determining that one of the multiple JIT compilation iterations is to remain programmed on the programmable logic device.

15. A non-transitory machine-readable storage medium comprising instructions that, when executed, cause at least one processor to at least:

initiate multiple just-in-time (JIT) compilation iterations of an application, wherein a data parallel programming compiler to generate the multiple JIT compilation iterations of the application;

program a first architecture of a first compilation of the multiple JIT compilation iterations to a programmable logic device;

execute the application on the first architecture, wherein the first compilation comprises a faster compilation time amongst the multiple JIT compilation iterations;

identify a hotspot corresponding to a runtime metric of the application meeting a threshold condition;

determine that a second compilation of the multiple JIT compilation iterations is complete, wherein the second compilation comprises a slower compilation time than the first compilation;

program a second architecture of the second compilation of the multiple JIT compilation iterations to the programmable logic device; and execute the application on the second architecture.

16. The non-transitory machine readable storage medium of claim 15, wherein the multiple JIT compilation iterations comprise at least one of a soft instruction set architecture (ISA) processor compilation, an ISA hardened processor compilation, an overlay compilation, a soft coarse grained reconfigurable array (CGRA) compilation, or a full custom datapath compilation.

17. The non-transitory machine readable storage medium of claim 16, wherein a data parallel programming runtime of the at least one processor is further to orchestrate, based on a task graph of the application, a re-programming operation to reconfigure a region of the programmable logic device, and wherein the data parallel programming runtime is to generate the task graph of the application using compiled code of the application, the task graph to represent relationships and dependencies of the code.

18. The non-transitory machine readable storage medium of claim 15, wherein the runtime metric of the application meeting the threshold condition comprises at least one of a runtime latency of the application exceeding a determined latency threshold or a runtime throughout of the application exceeding a determined throughput threshold.

19. The non-transitory machine readable storage medium of claim 15, wherein the processor is further to terminate one or more of the multiple JIT compilation iterations for the application in response to determining that one of the multiple JIT compilation iterations is to remain programmed on the programmable logic device.

* * * * *